US012303450B1

(12) United States Patent
Cheng et al.

(10) Patent No.: US 12,303,450 B1
(45) Date of Patent: May 20, 2025

(54) BIDIRECTIONAL STIMULATION MASSAGE DEVICE

(71) Applicants: DONGGUAN SHENGBEI ELECTRONIC TECHNOLOGY CO., LTD., Dongguan (CN); SHENZHEN OLIVIA INTERNATIONAL TRADING CO., LTD., Shenzhen (CN)

(72) Inventors: Zhongwei Cheng, Dongguan (CN); Haowei Ma, Shenzhen (CN)

(73) Assignee: DONGGUAN SHENGBEI ELECTRONIC TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/959,975

(22) Filed: Nov. 26, 2024

(30) Foreign Application Priority Data

Sep. 5, 2024 (CN) ........................ 202411245190.3

(51) Int. Cl.
*A61H 19/00* (2006.01)

(52) U.S. Cl.
CPC ..... *A61H 19/32* (2013.01); *A61H 2201/1207* (2013.01)

(58) Field of Classification Search
CPC ...................................................... A61H 19/32
See application file for complete search history.

(56) References Cited

U.S. PATENT DOCUMENTS

| | | | | |
|---|---|---|---|---|
| 11,857,480 | B1 * | 1/2024 | Wu | A61H 19/40 |
| 2009/0069629 | A1 * | 3/2009 | Uson Calvo | A61H 19/50 600/38 |
| 2010/0268021 | A1 * | 10/2010 | Standfest | A61H 15/0078 600/38 |
| 2013/0123674 | A1 * | 5/2013 | Carter | A61H 23/0245 601/46 |
| 2015/0157531 | A1 * | 6/2015 | Sedic | A61H 19/40 601/46 |
| 2022/0395426 | A1 * | 12/2022 | Myerson | A61H 19/44 |

FOREIGN PATENT DOCUMENTS

| | | | | |
|---|---|---|---|---|
| GB | 2569828 A | * 7/2019 | | A61F 5/41 |
| KR | 20230167488 A | * 12/2023 | | |

* cited by examiner

*Primary Examiner* — Thaddeus B Cox
(74) *Attorney, Agent, or Firm* — Ming Jiang; OPENPTO US LLC

(57) ABSTRACT

Disclosed is a bidirectional stimulation massage device, which includes a thin-walled structure having a channel, an inner wall and an outer wall, and a first stimulation device, where the first stimulation device is arranged in a position at a non-end portion of the thin-walled structure and is configured to provide massage stimulation to both the inner wall and the outer wall at the same time. The device can apply pressure and friction in an active or passive manner by introducing the first stimulation device, which not only provides stronger physical stimulation, but also enhances psychological excitement and satisfaction of a user. Further, the first stimulation device can facilitate the bidirectional stimulation massage to both male and female male reproductive organs at the same time according to actions of the user, thereby strengthening emotional connection and interactive pleasure between partners.

18 Claims, 23 Drawing Sheets

BIDIRECTIONAL STIMULATION MASSAGE DEVICE

CROSS-REFERENCE OF RELATED APPLICATION

The present invention claims priorities of Chinese Patent Application No. 202411245190.3, filed on Sep. 5, 2024, the entire contents of which are hereby incorporated by reference.

TECHNICAL FIELD

The disclosure relates to the technical field of sexual products and the technology for realizing bidirectional stimulation, and particularly relates to a bidirectional stimulation massage device.

BACKGROUND

In recent years, as people pay increasing attention to the quality of intimate relationships and experience, a wide range of innovative adult products have gradually came on the market. However, although these products are designed to improve the quality of intimate relationships and meet personalized needs, the existing adult products still have significant deficiencies in both technical design and user experience, which restrict their functions and market expansion.

At present, most of the adult products available on the market are usually designed for a single gender or a single object. For example, vibrating massagers are often designed for women, and mainly focus on stimulating sensitive areas through vibrations or other mechanical actions to help women achieve greater sexual satisfaction. However, the applicability of these products to men is relatively constrained, as they cannot provide same degrees of experience and satisfaction for male users. Similarly, adult products specifically designed for men, such as self-satisfaction devices, cannot provide any good experience for women. The single design severely limits applicable scopes of these products, resulting in a lack of interactive and synchronized experience between a couple or sexual partners when these products are used.

Furthermore, many of the adult products are designed to focus on unidirectional stimulation, ignoring the importance of interaction between sexual partners. In an intimate relationship, the interaction and emotional communication between the sexual partners are crucial for enhancing the relationship. However, the existing products usually provide stimulation only for one of the sexual partners, while the other sexual partner lacks corresponding physiological feedback, thereby being difficult to form good interactive experience. The design is not enough to meet the needs of both of the sexual partners for joint use, affecting the effects of intimate experience.

In addition, some adult products are designed primarily for invasive stimulation, such as plug-in massagers or dilators, which may provide strong physiological stimulation. Nevertheless, these products are usually suitable for only one gender and cannot simultaneously satisfy both of the sexual partners, thus affecting the harmony and overall experience of the interaction between the sexual partners.

The current design of many products is unable to satisfy the needs of both of the sexual partners, resulting in a less desirable experience. The sexual partners have to use their respective products separately, making the operation complicated and inconvenient, which affects the smoothness and overall satisfaction of the sexual experience. Furthermore, a single-object design also ignores the emotional communication and synchronized experience that the sexual partners often seek during intimate interactions, further limiting the market acceptance and applicable scopes of these products.

SUMMARY

In order to solve the above technical problems, the disclosure provides a bidirectional stimulation massage device.

In order to achieve the above objective, the disclosure adopts the following technical solutions:

a bidirectional stimulation massage device, including a thin-walled structure having a channel;

where the thin-walled structure has an inner wall and an outer wall; and a first stimulation device;

where the first stimulation device is arranged in a position at a non-end portion of the thin-walled structure; and the first stimulation device is configured to be located between the inner wall and the outer wall, and is capable of providing massage stimulation to both the inner wall and the outer wall at the same time.

Preferably, the thin-walled structure has a set length L in the axial direction; and the set length L is not less than 4 cm.

Preferably, the channel is a continuous channel structure formed by a circumferential wall surface of the thin-walled structure;

alternatively, the channel is a non-continuous channel structure formed by the circumferential wall surface of the thin-walled structure;

the continuous channel structure is a complete continuous annular wall structure of the channel without any gaps in the circumferential wall surface of the thin-walled structure; and the non-continuous channel structure has a gap or notch in a specific position on a circumferential wall surface of the channel.

Preferably, the first stimulation device includes an electric stimulation assembly having an electric drive module and a mechanical vibration module;

where the electric drive module is composed of one or more of a rotary motor, a linear motor, and an electromagnetic attraction unit, as well as a battery, a drive circuit, and a control circuit;

the mechanical vibration module is connected to one or more of the rotary motor, the linear motor, and the electromagnetic attraction unit, and responds to motion generated by the electric drive module to output mechanical vibrations externally.

Preferably, the inner wall of the thin-walled structure is provided with an ejaculating compression and control area;

a length L2 of the ejaculating compression and control area has in an axial direction of the thin-walled structure is not less than 2 cm; and the ejaculating compression and control area is configured to provide an ejaculating compression and control function for a user.

Preferably, the ejaculating compression and control area on the inner wall is provided with a ridge-like protrusion;

the ridge-like protrusion is configured to provide local compression to an area where the penis being in contact with the ridge-like protrusion;

where a pressure P1 generated by the local compression is greater than an average pressure P0 applied by the thin-walled structure to the penis that wears the massage device. Preferably, a position of the first stimulation device on the circumferential wall surface of the thin-walled structure is defined as a first region;

a positions of the ridge-like protrusion on the circumferential wall surface of the thin-walled structure is defined as a second region; and the first region and the second region are arranged opposite to each other at an interval of 180°.

Preferably, each of the inner wall and the outer wall is provided with a flexible surface layer, including a vibration transmission element;

where the inner wall and the outer wall enclose to form an accommodating cavity;

the vibration transmission element is arranged inside the accommodating cavity;

a hardness D1 of the vibration transmission element is greater than a hardness D2 of the flexible surface layer; and the first stimulation device is arranged inside the vibration transmission element, which is configured to transmit mechanical vibrations from the first stimulation device to a covered area; and the covered area is the circumferential wall surface of the thin-walled structure being in contact with a human body part.

Preferably, the vibration transmission element includes a first transmission edge;

where the first transmission edge is arranged at a front end of the thin-walled structure in the axial direction.

Preferably, the vibration transmission element includes:

a first transmission area and a second transmission area;

where the first transmission area and the second transmission area extend from a center of the first region respectively along the circumferential wall surface of the thin-walled structure towards the second region; and a radian covered by a surface area formed by the extension of the first transmission area and the second transmission area on the circumferential wall surface of the thin-walled structure is not less than $\pi/2$.

Preferably, the radian covered by the surface area formed by the extension of the first transmission area and the second transmission area on the circumferential wall surface of the thin-walled structure ranges from 1.7 to $\pi$.

Preferably, the bidirectional stimulation massage device further includes a collar;

where the collar is arranged at a rear end of the thin-walled structure in the axial direction; and the collar is arranged on a side of the second region of the thin-walled structure in a circumferential direction; and the collar is suitable for being sleeved over testicles when the thin-walled structure is worn, such that the thin-walled structure can be stabilized.

Preferably, the bidirectional stimulation massage device further includes an electric control compartment;

where the electric control compartment is arranged at the rear end of the thin-walled structure in the axial direction; and the electric control compartment is located outside a vaginal orifice when the thin-walled structure is inserted into the vagina with the sexual intercourse; and the electric control compartment is configured to accommodate the battery, the drive circuit, and the control circuit.

Preferably, the bidirectional stimulation massage device further includes a second stimulation device;

the second stimulation device is arranged at the rear end of the thin-walled structure in the axial direction; and the second stimulation device is arranged on a side of the first region of the thin-walled structure in the circumferential direction; and the second stimulation device is configured to massage and stimulate a C point.

Preferably, the second stimulation device is an electric stimulation massage device; and the second stimulation device is a local circumferential wall surface of the thin-walled structure, and the local circumferential wall surface is bent and extended in a direction away from an axis of the thin-walled structure.

Preferably, the bidirectional stimulation massage device further includes:

a third stimulation device;

the third stimulation device is arranged at the rear end of the thin-walled structure in the axial direction; and the third stimulation device is arranged on the side of the second region of the thin-walled structure in the circumferential direction.

Preferably, the bidirectional stimulation massage device further includes:

a second elastic support portion;

a first side of the second elastic support portion is connected to the third stimulation device; and a second side of the second elastic support portion arranged opposite to the first side is connected to the collar.

Preferably, the bidirectional stimulation massage device further includes:

a coverage portion; and the coverage portion is arranged at the front end of the thin-walled structure in the axial direction.

Preferably, the bidirectional stimulation massage device further includes:

a vibration isolation portion;

the vibration isolation portion is arranged between the coverage portion and the thin-walled structure; and the vibration isolation portion is configured to absorb vibration energy generated by the first stimulation device.

Preferably, an outer wall of the thin-walled structure is provided with a stimulation structure; and the stimulation structure is spherical protrusions, annular protrusions, or semi-annular protrusions.

The disclosure provides a bidirectional stimulation massage device, which has the following beneficial effects:

The massage device can apply pressure and friction in an active or passive manner by introducing the first stimulation device, which not only provides stronger physical stimulation physically, but also enhances psychological excitement and satisfaction of the user. The first stimulation device can facilitate the bidirectional stimulation massage according to actions of the user, such as pushing, pulling, or rotating, this feedback mechanism enables the massage device to enhance the stimulation effect during use, and provides richer experience changes for the users. Especially, during the use in a prolonged period of time, this dynamic response ability can prevent fatigue caused by single stimulation, making the user enjoy continuous pleasure. The bidirectional stimulation is not only limited to a physical level, but also enhances emotional connection and interactive enjoyment between the couple by acting on key sexual parts of the couple at the same time.

In summary, the addition of the first stimulation device is not merely a structural improvement of the massage device, but aims to create more personalized, dynamic, and interactive experience in specific application scenarios, and the creative design breaks the limitations of traditional massage devices and provides a higher level of satisfaction.

Figure 1:
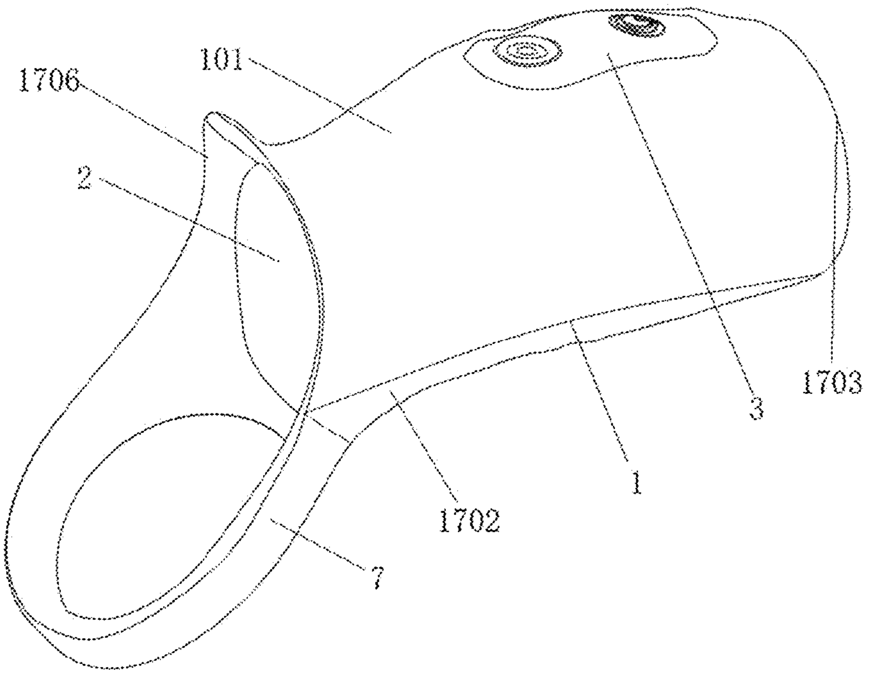
FIG. 1 is a first perspective view of a bidirectional stimulation massage device according to the disclosure.

Reference numerals in the accompanying drawings:

1. thin-walled structure; 101. inner wall; 102. outer wall; 2. channel; 201. notch; 202. mesh structure; 203. first opening; 204. second opening; 3. first stimulation device; 301. electric drive module; 3011. rotating motor; 3012. electromagnet; 3013. ultrasonic vibrator; 3014. stepper motor; 3016. rotary motor; 302. mechanical vibration module; 3021. eccentric wheel; 3022. metal sheet; 3023. ultrasonic probe; 3024. sliding sheet; 3026. rolling bearing; 303. displacement module; 3031. slide rod; 3032. cavity; 304. driven mechanism module; 3041. sphere; 3042. stimulation ball; 4. ejaculating compression and control area; 401. local protrusion; 402. inflatable bag; 403. spiral band; 404. embedded airbag; 405. ridge-like protrusion; 5. vibration transmission element; 501. first transmission edge; 6. flexible surface layer; 7. collar; 8. electric control compartment; 9. second stimulation device; 11. third stimulation device; 12. second elastic support portion; 13. coverage portion; 14. vibration isolation portion; 15. local circumferential wall surface; 16 stimulation structure; 1701, first region; 1702. second region; 1703. front end; 1704. first transmission area; 1705. second transmission area; and 1706. rear end.

DETAILED DESCRIPTION OF PREFERRED EMBODIMENTS

The technical solutions of embodiments of the present invention will be described below clearly and comprehensively in conjunction with accompanying drawings of the embodiments of the present invention. Apparently, the embodiments described are merely some embodiments rather than all embodiments of the present invention. All the other embodiments obtained by those of ordinary skill in the art based on the embodiments in the disclosure without creative efforts shall fall within the scope of protection of the disclosure.

Figure 2:
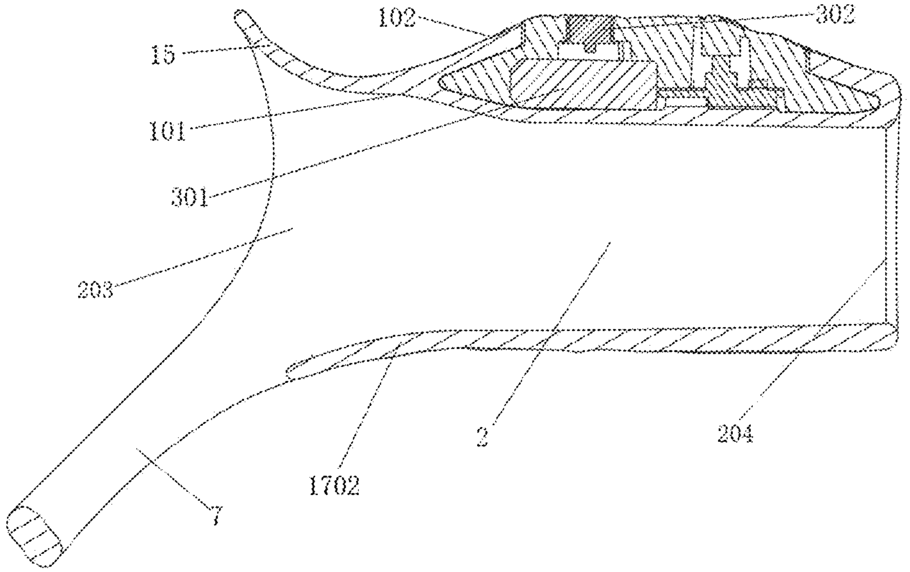
FIG. 2 is a sectional view of the structure shown in FIG. 1.

With reference to FIGS. 1-47, specific embodiments provided by the disclosure are as follows:

as shown in FIGS. 1-2, a first embodiment of the disclosure provides a bidirectional stimulation massage device, including:

a thin-walled structure 1 having a channel 2, where the thin-walled structure 1 has a set length L in an axial direction; and the set length L is not less than 4 cm;

the thin-walled structure 1 has an inner wall 101 and an outer wall 102;

a first stimulation device 3;

where the first stimulation device 3 is arranged in a position at a non-end portion of the thin-walled structure 1; and the first stimulation device 3 is configured to be located between the inner wall 101 and the outer wall 102, and is capable of providing massage stimulation to both the inner wall 101 and the outer wall 102 at the same time.

In this embodiment, the channel 2 is used for facilitating a penis being sheathed in, such that the inner wall 101 of the thin-walled structure 1 is in contact with a surface of the penis, and the outer wall 102 is in contact with an inner wall of a vagina.

Specifically, the channel 2 is provided with at least one first opening 203, the penis is inserted into the channel 2 through the first opening 203 to complete the wearing, and after the wearing is completed, a male can insert both the penis and the thin-walled structure 1 into the female vagina.

In another specific embodiment, the channel 2 is further provided with a second opening 204, and the first opening 203 and the second opening 204 are openings at two ends of the channel 2 in an axial direction, such that the thin-walled structure 1 forms a structure that passes through the channel 2.

Alternatively, in another specific embodiment, the channel 2 has only one first opening 203, and the other end of the channel 2 is a closed structure.

Specifically, a thickness of the thin-walled structure 1 ranges from 2 mm to 6 mm.

Specifically, a reason for setting the set length L of the thin-walled structure 1 is to ensure simultaneous massage stimulation of both the penis and the inner wall of the vagina. By setting the length L of the thin-walled structure 1 to not less than 4 cm, it is ensured that the massage device is capable of covering an effective length of the penis, such that the first stimulation device 3 is in an optimal position to apply massage stimulation to both the inner wall 101 and the outer wall 102 of the thin-walled structure 1, thereby providing effective stimulation to both the surface of the penis and the inner wall of the vagina.

More specifically, by setting the length L, the inner wall 101 of the thin-walled structure 1 is capable of fitting closely to the surface of the penis when the massage device is in normal use, ensuring that the first stimulation device 3 in the position of the non-end portion the thin-walled structure 1 is in close contact with a specific part of the penis. In addition, the outer wall 102 of the thin-walled structure 1 is in contact with the inner wall of the vagina, through the bidirectional pressure distribution and friction effect, the first stimulation device 3 is capable of stimulating both the penis and the inner wall of the vagina simultaneously during each process of insertion and withdrawal.

this design of the length not only considers an average size of the penis to ensure that the first stimulation device 3 is capable of covering main sensitive areas of the penis, but also ensures that the massage device is not easy to slide or shift when in use, such that continuous and stable stimulation can be provided. Setting the length L to be not less than 4 cm can also prevent insufficient or uneven stimulation caused by the massage device being too short, and prevent discomfort or inconvenience caused by the massage device being too long. Therefore, determination of the length range aims to optimize comfort of a user and functionality of the massage device, ensuring the maximization of bidirectional stimulation effects.

Addition of the first stimulation device 3 aims to enhance the functionality and stimulation effects of the massage device in sexual activity by introducing an additional mechanical action structure (which can be either a powered or non-powered mechanical structure). Specifically, the first stimulation device 3 is designed for solving the problem that the ordinary thin-walled structure 1 is difficult to provide sufficient and even stimulation, especially when the inner wall 101 is in contact with the penis, and the outer wall 102 is in contact with the inner wall of the vagina.

The first stimulation device 3 is arranged in the position of the non-end portion of the thin-walled structure 1, such that it is capable of focusing on the specific part of the penis and sensitive areas of the inner wall of the vagina for concentrated stimulation. When in use, the traditional thin-walled structure 1 mainly relies on the elasticity of a thin wall to produce a certain degree of friction and compression effect. However, intensity and range created by this passive stimulation are usually insufficient and may not meet the needs of the user for stronger or more continuous stimulation.

The introduction of the first stimulation device 3 can effectively enhance massage stimulation sensation of the massage device during use by actively applying pressure and generating friction, and produce a targeted massage effect through structural design, which cannot only achieve a stronger bidirectional stimulation effect by increasing friction coefficient and pressure distribution, thereby providing better use effects and pleasure response.

The bidirectional stimulation massage device in this embodiment can provide richer and stronger sensory experience through the action of the first stimulation device 3 on the basis of achieving simultaneous stimulation to both the penis and the inner wall of the vagina, thereby meeting higher requirements of the user for functionality and experience effect of the massage device.

In addition, the addition of the first stimulation device 3 is not only to improve basic functionality of the massage device, but also to achieve a highly personalized and creative user experience in specific application scenarios, this design takes into account complete needs in real use environments, and aims to address the limitations of traditional massage devices in meeting diverse needs of different users.

In specific application scenarios, such as intimate interactions between a couple, the user often seeks a device capable of providing deeper satisfaction on multiple sensory levels. The traditional thin-walled structure 1 can only provide passive friction in a single one direction, the massage device can apply pressure and friction in an active or passive manner by introducing the first stimulation device 3, which not only provides stronger physical stimulation, but also enhances psychological excitement and satisfaction of the user Further, the first stimulation device 3 can facilitate the bidirectional stimulation massage according to actions of the user, such as pushing, pulling, or rotating, this feedback mechanism enables the massage device to enhance the stimulation effect during use, and provides richer experience changes for the user. Especially, during the use in a prolonged period of time, this dynamic response ability can prevent fatigue caused by unidirectional stimulation, making the user enjoy continuous pleasure. The bidirectional stimulation is not only limited to a physical level, but also enhances emotional connection and interactive enjoyment between the couple by acting on key sexual parts of the couple at the same time.

In summary, the addition of the first stimulation device 3 is not merely a structural improvement of the massage device, but aims to create more personalized, dynamic, and interactive experience in specific application scenarios, and the creative design breaks the limitations of traditional massage devices and provides a higher level of satisfaction.

Figure 47:
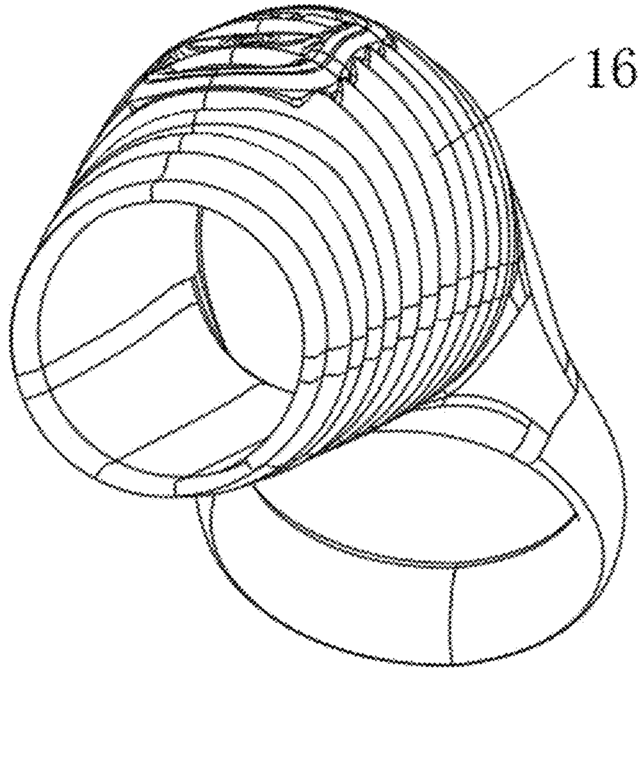
FIG. 47 is a schematic diagram of a stimulation structure in a bidirectional stimulation massage device according to the disclosure.

As shown in FIG. 47, in another specific embodiment, a stimulation structure 16 is formed on the outer wall 102 of the thin-walled structure. The stimulation structure 16 is configured to generate stronger stimulation sensation to the inner wall of the vagina, stimulation structure 16 can be a plurality of spherical protrusions, or a plurality of annular protrusions or semi-annular protrusions arranged in the axial direction of the thin-walled structure 1, in which case, the outer wall 102 is in the form of a corrugated surface.

As shown in FIGS. 1 and 2, in one specific embodiment, the channel 2 is a continuous channel structure formed by a circumferential wall surface of the thin-walled structure 1. The continuous channel structure is a complete continuous annular wall structure of the channel 2 without any gaps in the circumferential wall surface of the thin-walled structure.

One of the manifestations is that the thin-walled structure 1 is a sleeve structure, and thin-walled structure 1 has the complete circumferential wall surface.

Figure 19:
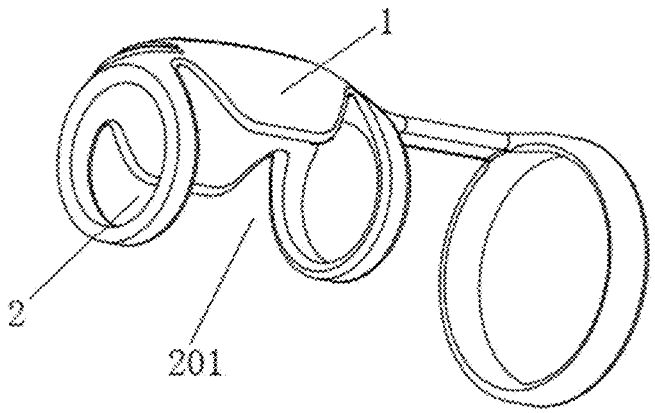
FIG. 19 is a tenth perspective view of a bidirectional stimulation massage device according to the disclosure.
Figure 20:
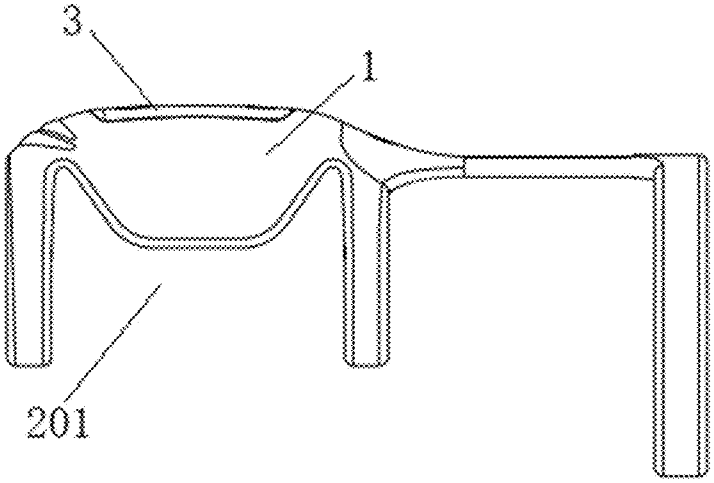
FIG. 20 is a front view of the structure shown in FIG. 19.
Figure 21:
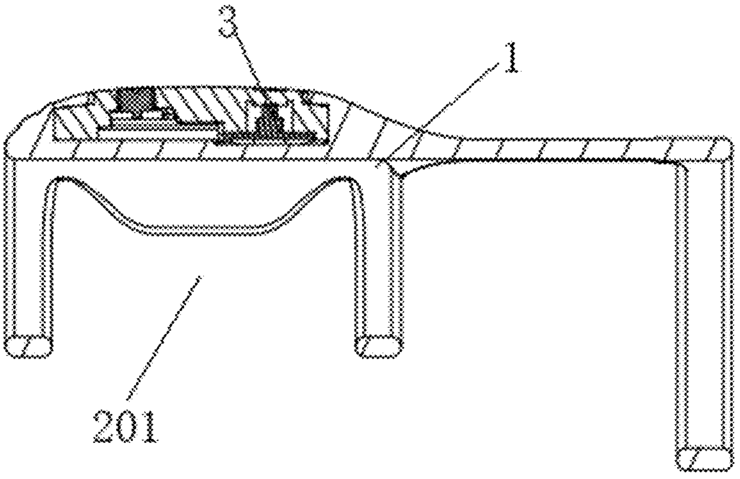
FIG. 21 is a sectional view of the structure shown in FIG. 20.

As shown in FIGS. 19-21, in another specific embodiment, the channel 2 is a non-continuous channel structure formed by the circumferential wall surface of the thin-walled structure 1. The non-continuous channel structure has a gap or notch 201 in a specific position on a circumferential wall surface of the channel 2.

One of the manifestations is that the thin-walled structure 1 is provided with a plurality of regularly spaced longitudinal openings or slits in specific positions on the circumferential wall surface. The plurality of openings or slits can generate additional flexibility and deformability when the massage device is used, allowing the channel 2 to expand or contract properly under external force, thereby increase local stimulation effect on the penis and the inner wall of the vagina, this design not only improves the fit of the massage device, but also provides more complex and diverse sensory experience through periodic changes of the gap or notch 201, adapting to use habits and preferences of different users.

Figure 16:
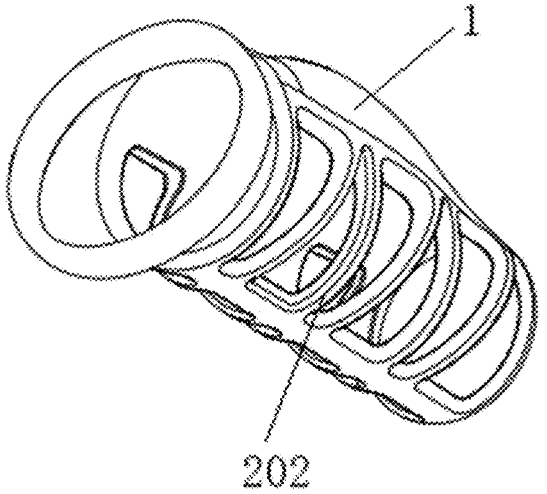
FIG. 16 is a ninth perspective view of a bidirectional stimulation massage device according to the disclosure.
Figure 17:
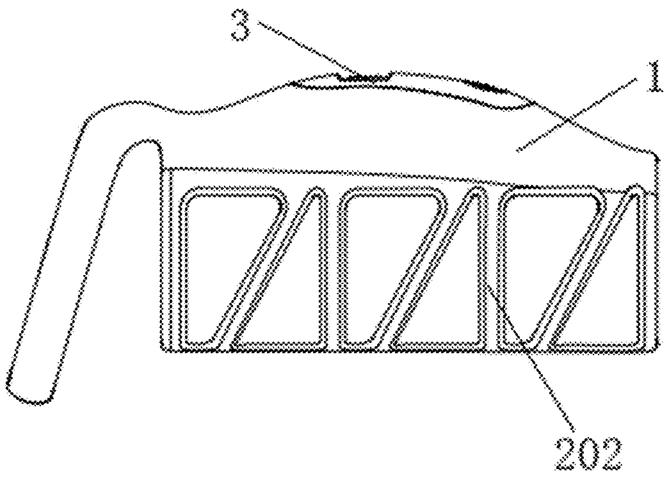
FIG. 17 is a front view of the structure shown in FIG. 16.
Figure 18:
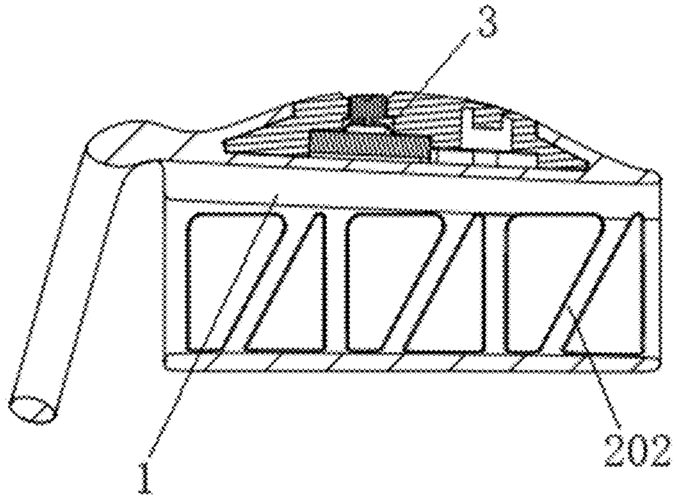
FIG. 18 is a sectional view of the structure shown in FIG. 17.

As shown in FIGS. 16-18, the other manifestation is that the thin-walled structure 1 is provided with a plurality of staggered regular or irregular mesh structures 202 (such as a spider web-like design) in the specific positions on the circumferential wall surface, the mesh structures 202 form a plurality of staggered grids on the thin-walled structure 1, such that the channel 2 has greater elasticity and breathability in a specific area, this design can provide unique tactile stimulation during use; when the thin-walled structure 1 is subjected to external force, the mesh portion can be locally deformed and produce a massage effect different from that of the continuous wall surface. In addition, the mesh structures 202 can enhance the stability of the massage device in some cases, preventing slipping during use, and providing richer sensory experience through irregular tactile sensations.

A second embodiment of the disclosure provides a bidirectional stimulation massage device, and on the basis of the first embodiment, the first stimulation device 3 includes:

an electric stimulation assembly having an electric drive module 301 and a mechanical vibration module 302;

where the electric drive module 301 is composed of one or more of a rotary motor 3016, a linear motor 3014, and an electromagnetic attraction unit, as well as a battery, a drive circuit, and a control circuit;

the mechanical vibration module 302 is connected to one or more of the rotary motor 3016, the linear motor 3014, and the electromagnetic attraction unit, and responds to motion generated by the electric drive module 301 to output mechanical vibrations externally.

In this embodiment, the first stimulation device 3 adopts an active electrical stimulation form, specifically, the stimulation experience is created in a form of electrical energy drive.

Figure 24:
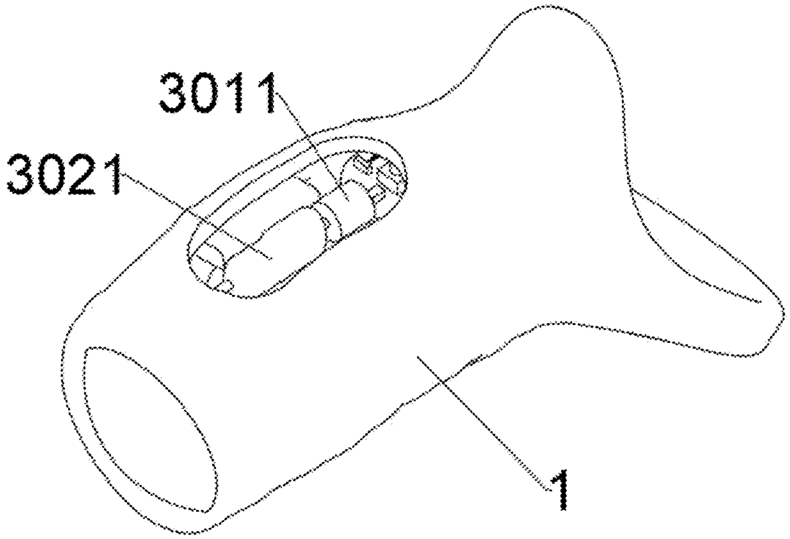
FIG. 24 is a schematic diagram of one structure of a first stimulation device in a bidirectional stimulation massage device according to the disclosure.
Figure 25:
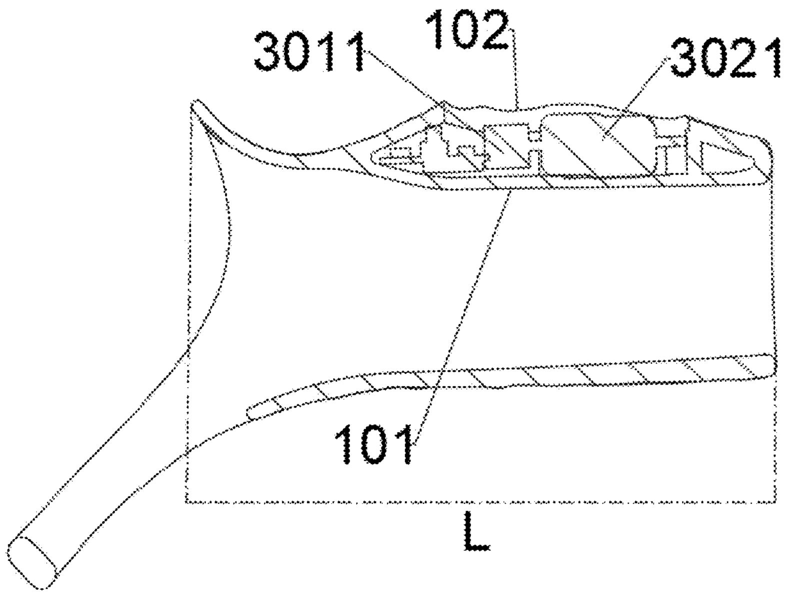
FIG. 25 is a sectional view of the structure shown in FIG. 24.

As shown in FIGS. 24 and 25, in one specific form, the electric drive module 301 is a rotating motor 3011, and the mechanical vibration module 302 is an eccentric wheel 3021 or an eccentric block. The rotating motor 3011 is connected to a power source to obtain electrical energy and drives the eccentric wheel 3021 or the eccentric block that is connected to a drive end of the rotating motor 3011 to produce vibration massage stimulation effects.

Figure 26:
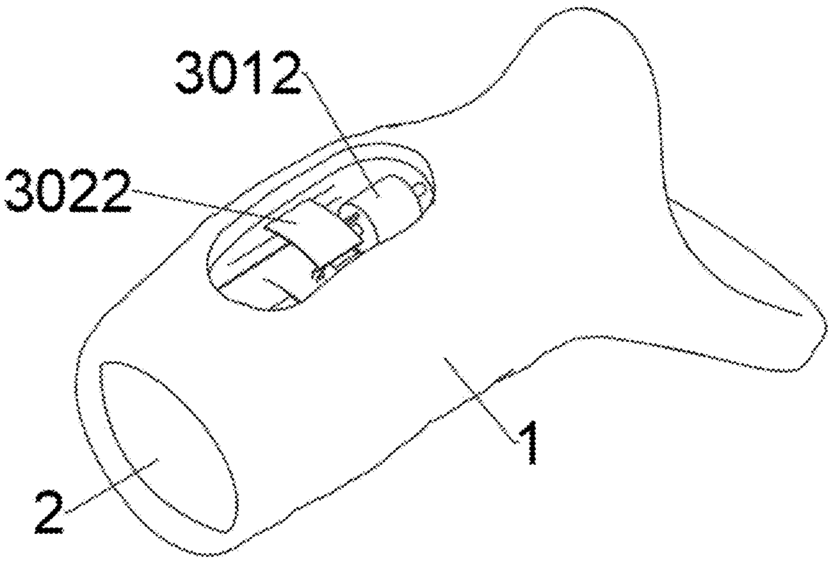
FIG. 26 is a schematic diagram of another structure of a first stimulation device in a bidirectional stimulation massage device according to the disclosure.
Figure 27:
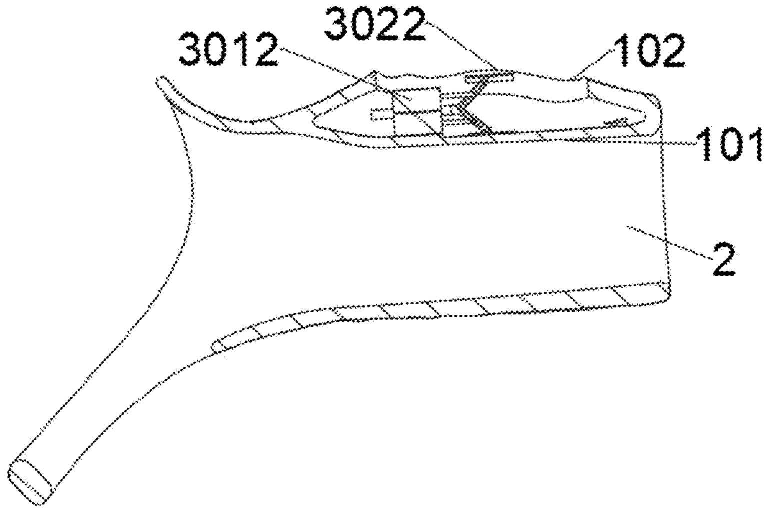
FIG. 27 is a sectional view of the structure shown in FIG. 26.

As shown in FIGS. 26 and 27, in another specific form, the electric drive module 301 adopts a combination of an electromagnet 3012 and the control circuit, the mechanical vibration module 302 is usually composed of components capable of giving response to changes in an electromagnetic field, such as a metal sheet 3022, an elastic diaphragm or a transmission rod. By periodically switching a direction of current or adjusting an intensity of the current, a pulsed electromagnetic field is generated. The electromagnetic field drives the mechanical vibration module 302 to generate rapid pulse vibrations or push-pull motion, thereby producing an electromagnetic pulsed stimulation effect at a massage site, which is particularly suitable for massage applications requiring high-frequency vibrations with relatively small amplitudes.

Figure 28:
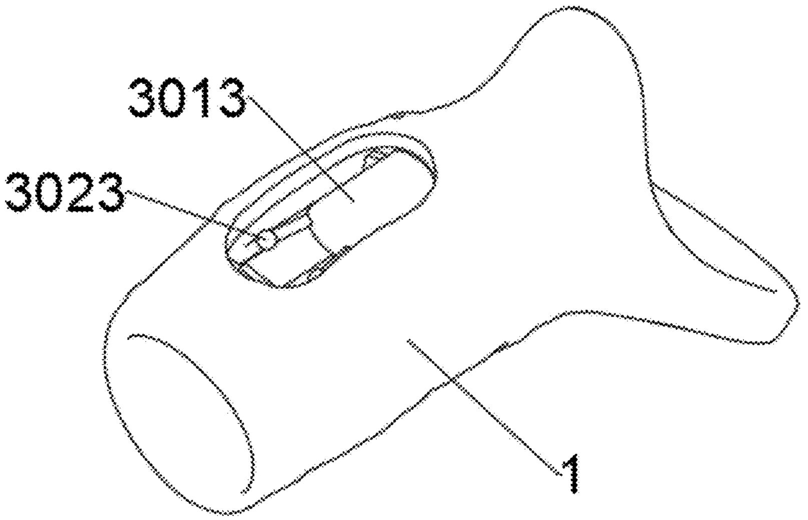
FIG. 28 is a schematic diagram of yet another structure of a first stimulation device in a bidirectional stimulation massage device according to the disclosure.

As shown in FIG. 28, in another specific form, the electric drive module 301 of the first stimulation device 3 is an ultrasonic vibrator 3013, the ultrasonic vibrator 3013 converts the electrical energy into high-frequency vibration waves to generate ultrasonic vibrations, which are then transmitted to the mechanical vibration module 302, and the mechanical vibration module can be an ultrasonic probe 3023 or other components capable of conducting ultrasonic waves; and when being transmitted to a massage area, the ultrasonic vibrations can penetrate surface tissue, providing deep micro-vibration massage, which is particularly suitable for physical therapy and massage of deep tissue.

Of course, in addition to generating vibrations or similar vibration-like massage effects, the first stimulation device 3 can also adopts the following massage forms:

For example, the first stimulation device 3 can produce scraping sensation, or a sliding or rolling massage effect.

Figure 29:
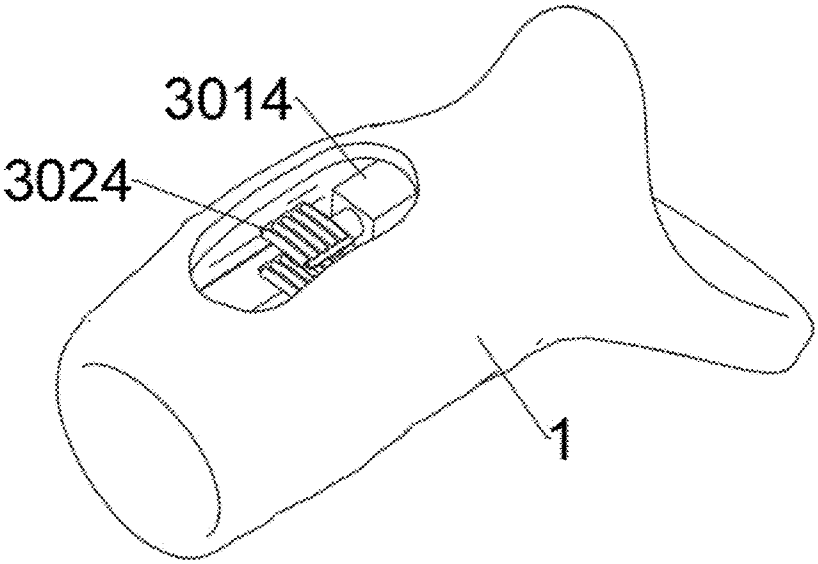
FIG. 29 is a schematic diagram of yet another structure of a first stimulation device in a bidirectional stimulation massage device according to the disclosure.
Figure 30:
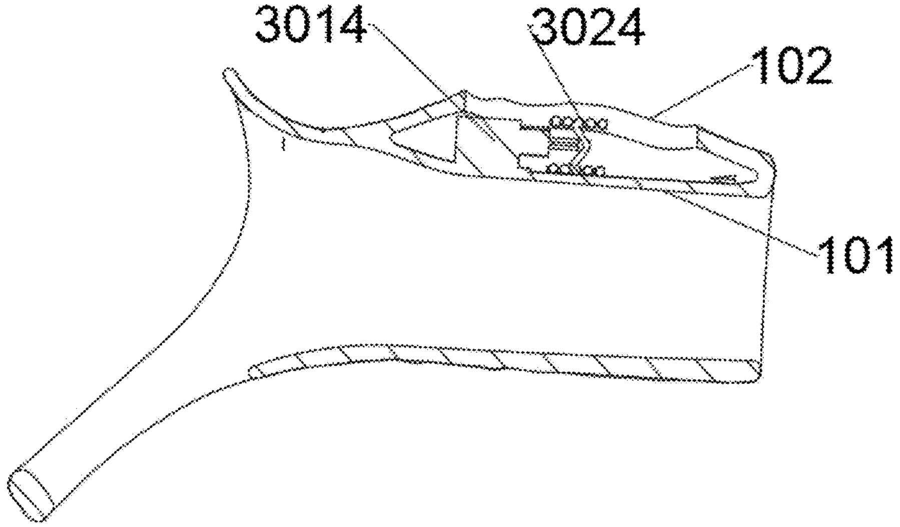
FIG. 30 is a sectional view of the structure shown in FIG. 29.

Specifically, the electric drive module 301 can be:

as shown in FIGS. 29 and 30, a stepper motor 3014 can be used as the electric drive module 301, and can precisely control a moving distance and a speed of the mechanical vibration module 302. Specifically, by driving a sliding sheet 3024 having toothed edges or textures, the stepper motor 3014 is capable of producing scraping sensation on the massage area, the scraping sensation can simulate the effect of fingers or a scraping plate scrapping on skin, and is suitable for promoting local blood circulation and relaxing muscles.

Figure 31:
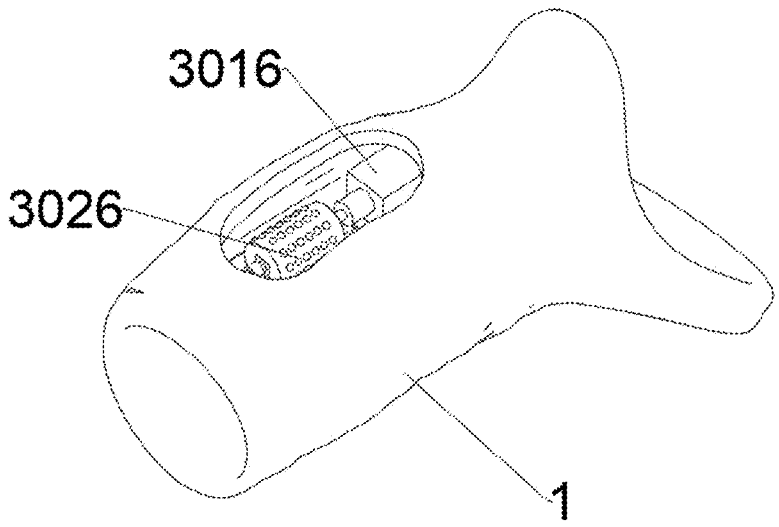
FIG. 31 is a schematic diagram of yet another structure of a first stimulation device in a bidirectional stimulation massage device according to the disclosure.
Figure 32:
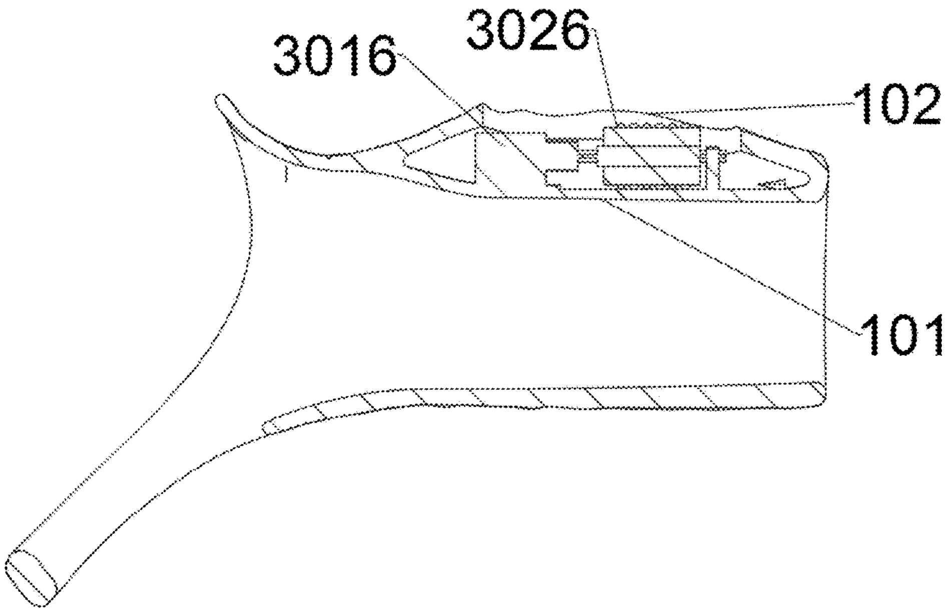
FIG. 32 is a sectional view of the structure shown in FIG. 31.

As shown in FIGS. 31 and 32, alternatively, the rotary motor 3016 can drive a set of rolling bearings 3026 or rollers to perform rolling motion, the rolling bearings 3026 can be designed to have an irregular surfaces or protrusions, thereby producing rolling and scraping effects on the massage area as driven by the rotary motor 3016. The rolling massage cannot only provide deep stimulation, but also produce continuous scraping sensation, which is suitable for massage applications requiring enhanced local stimulation.

By introducing the electric drive modules 301, the first stimulation device 3 can provide various massage forms, such as sliding or rolling scraping sensation. The massage forms can simulate the traditional massage techniques such as scrapping, rolling, or shiatsu, effectively promoting local blood circulation, relaxing tense muscles, and enhancing physiotherapy effects. The electric drive modules 301 having different powers allow precise control over intensity, speed, and frequency of scraping or rolling, thereby achieving personalized massage experience.

In addition, the first stimulation device 3 further includes:

a driven stimulation assembly having displacement modules 303 and driven mechanical modules 304.

In this form, the driven mechanical modules 304 are capable of producing massage stimulation effects in cooperation with thrusting actions through the displacement modules 303.

Figure 34:
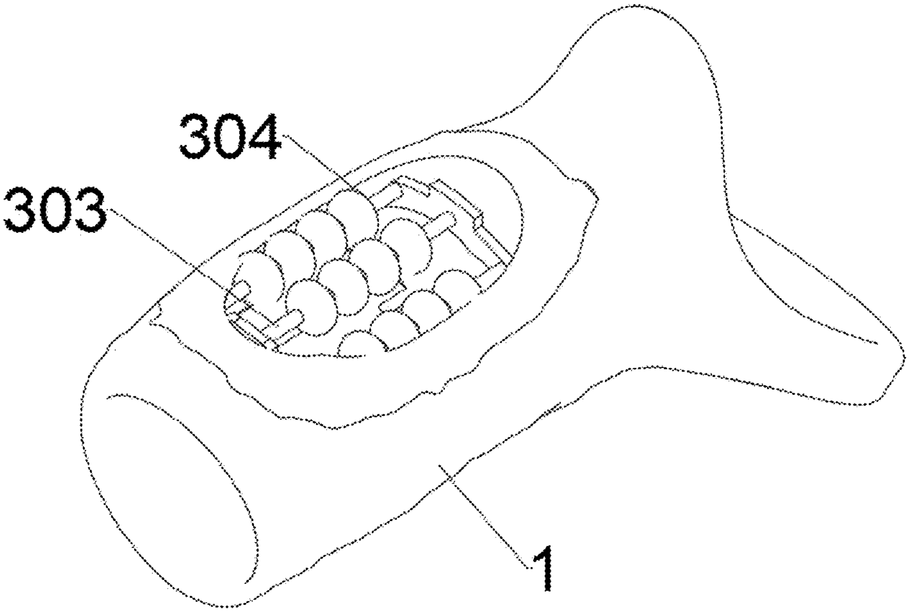
FIG. 34 is a schematic diagram of yet another structure of a first stimulation device in a bidirectional stimulation massage device according to the disclosure.
Figure 35:
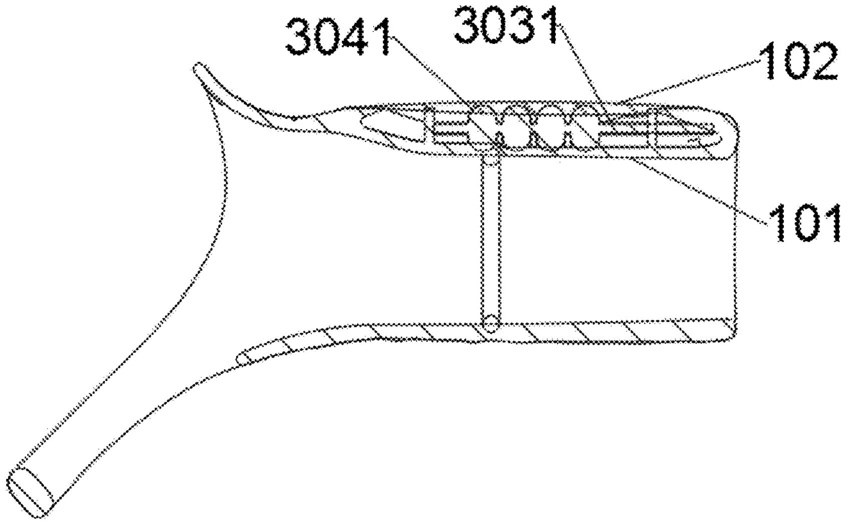
FIG. 35 is a sectional view of the structure shown in FIG. 34.

As shown in FIGS. 34 and 35, for example, the displacement modules 303 are slide rods 3031, and the driven mechanism modules 304 are one or more of spheres 3041 slidably connected to the slide rods 3031. Each of the spheres 3041 is capable of sliding freely on tracks of the slide rods 3031, and produce continuous physical stimulation with the thrusting actions, similar to rolling massage effects.

The spheres 3041 can be made from various materials, such as silicone, plastic, or metal, to provide different tactile sensations and massage intensities. Size and shape of the spheres 3041 can also be adjusted as needed to meet different massage requirements.

Figure 36:
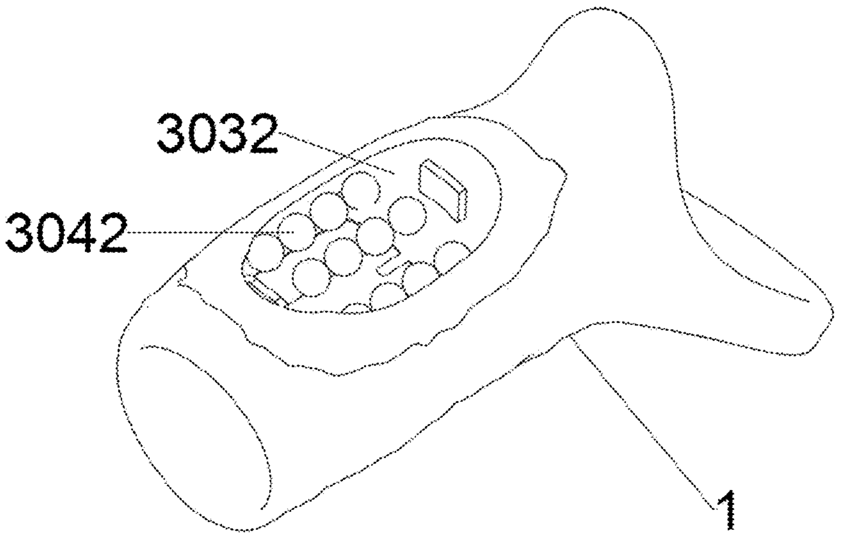
FIG. 36 is a schematic diagram of yet another structure of a first stimulation device in a bidirectional stimulation massage device according to the disclosure.
Figure 37:
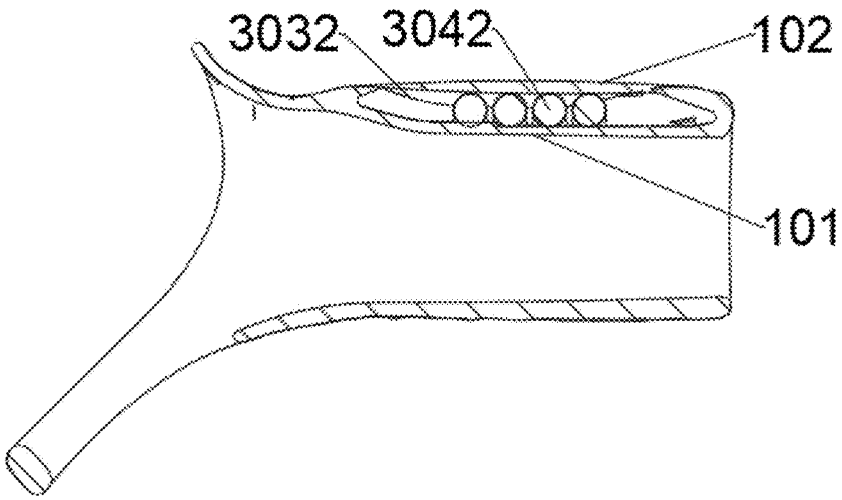
FIG. 37 is a sectional view of the structure shown in FIG. 36.

As shown in FIGS. 36 and 37, for example, a cavity 3032 is formed between the inner wall 101 and the outer wall 102, one or more stimulation balls 3042 are placed inside the cavity 3032, each of the stimulation balls 3042 is capable of rolling or sliding freely inside the cavity 3032, thereby producing continuous physical stimulation with the thrusting motions.

In either specific form mentioned above, the mechanical vibration module 302 or the driven mechanism modules 304 are designed to provide massage stimulation to both the inner wall 101 and the outer wall 102 simultaneously, thereby achieving synchronized stimulation for both sexual partners, this design significantly differs from the massage apparatuses in the prior art that is usually only for a single object (such as male or female), and has the following important features:

During operation, the mechanical vibration module 302 or the driven mechanism modules 304 can apply massage stimulation to both the inner wall 101 (male reproductive organs) and the outer wall 102 (female reproductive organs) simultaneously, the bidirectional stimulation design enables the massage device to provide physiological pleasure and physiotherapy effects for both sexual partners during use, thereby enhancing interactive experience between them.

The mechanical vibration module 302 or the driven mechanism modules 304 can produce various stimulation in different directions, regardless of in the form of vibration, sliding, or rolling motion. For the male, the stimulation of the inner wall 101 can act on the surface of the penis; for the female, the stimulation of the outer wall 102 can act on the inner wall of the vagina and a vulva, the multi-dimensional massage effects enable both sexual partners to receive continuous and rich sensory experience when the massage device is used.

By providing synchronized massage stimulation for both the male and the female, this design of the massage device is conducive to enhancing intimate interaction between both sexual partners. Since both sexual partners can simultaneously feel the stimulation from the massage device, they can enjoy synchronized pleasure and satisfaction, thereby enhancing emotional connection and understanding.

Most of the reproductive health massage devices in the prior art are usually designed for only one object, for example, providing massage stimulation only for the male or female reproductive organs, which impose great limitations on the use experience. In contrast, the disclosure benefits both sexual partners simultaneously by acting on both the inner wall 101 and the outer wall 102, greatly improving the practicality and market application potential of the massage device.

Through the above design, the first stimulation device 3 of the disclosure can effectively overcome the shortcomings of the prior art, and provide the user with more comprehensive and balanced massage experience, the synchronized bidirectional stimulation sensation not only improves the use effects, but also brings greater satisfaction to the user, meeting the needs of modern society for sexual harmony and reproductive health.

Figure 38:
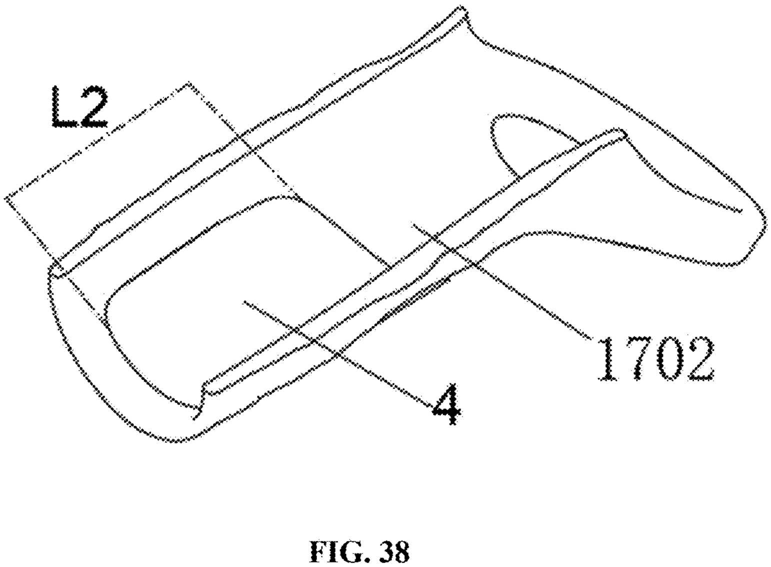
FIG. 38 is a schematic diagram of a location of an ejaculating compression and control area in a bidirectional stimulation massage device according to the disclosure.

As shown in FIG. 38, a third embodiment of the disclosure provides a bidirectional stimulation massage device, and on the basis of the previous embodiment, the inner wall 101 of the thin-walled structure 1 is provided with an ejaculating compression and control area 4.

In this embodiment, the ejaculating compression and control area 4 is designed and intended to provide more precise physiological control and physiotherapy effects. The ejaculating compression and control area 4 is arranged on the inner wall 101 of the thin-walled structure 1, and has a length L2 in the axial direction of the thin-walled structure being not less than 2 cm. By increasing local pressure in the specific area, the ejaculating compression and control area can apply moderate compression on the penis of a wearer, achieving an ejaculating control function.

A main function of the ejaculating compression and control area 4 is to control ejaculating time by applying moderate compression to the penis during wear, which can prolong duration of sexual activity, help improve sexual function, and enhance physiological experience. In addition, moderate pressure can increase blood flow to the penis, thereby enhancing hardness of erection and improving the quality of sexual life.

In this embodiment, the ejaculating compression and control area 4 is precisely designed to provide a sufficient compression area in the axial length while ensuring uniform distribution of pressure, which cannot only effectively control the ejaculating time but also avoid discomfort caused by excessive pressure, such that the user can maintain comfort while enhancing the experience.

On the basis of the previous embodiment, this embodiment combines bidirectional stimulation with the ejaculating control function, which means that, in addition to providing bidirectional massage stimulation for the inner wall 101 and outer wall 102, the massage device can provide the user with physiological control function through the ejaculating compression and control area 4, This combination greatly improves the versatility of the massage device, making it suitable not only for daily reproductive health massage but also for improving sexual dysfunction.

Further, the setting of the ejaculating compression and control area 4 is conducive to prolonging the duration of sexual activity, which is an ideal solution for some users with premature ejaculation problem. In addition, the massage device can enhance physiological pleasure and intimate interaction of the sexual partners during sexual activity through moderate compression.

The massage device is not only suitable for daily reproductive health maintenance, and also is used for treating sexual dysfunction, particularly premature ejaculation and erectile dysfunction. The user can choose whether to enable the compression and ejaculating control function according to actual needs, so as to flexibly response to different application scenarios.

In summary, on the basis of the previous embodiment, this embodiment further improves the functionality and use effects of the bidirectional stimulation massage device by introducing the ejaculating compression and control area 4, this design not only meets the needs of users for enhanced physiological experience but also provide more personalized physiotherapy options, bringing the user more comprehensive and comfortable experience.

Figure 39:
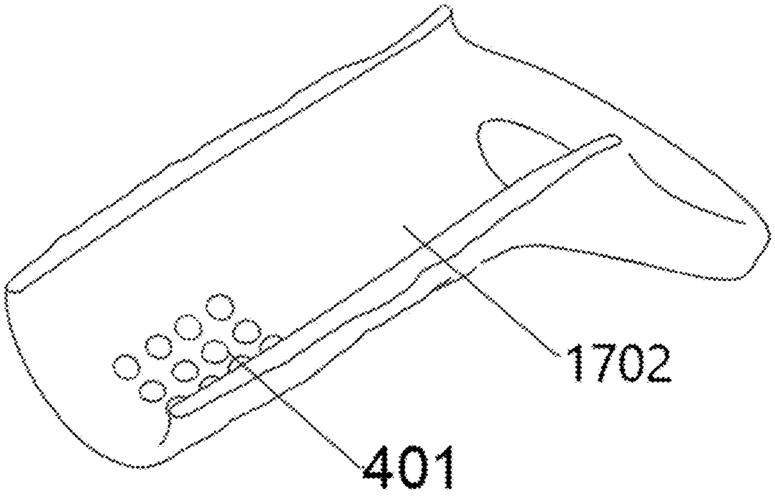
FIG. 39 is a schematic diagram of one structure of an ejaculating compression and control area in a bidirectional stimulation massage device according to the disclosure.

As shown in FIG. 39, in one specific embodiment, the ejaculating compression and control area 4 is configured for local compression. Specifically, this ejaculating compression and control area 4 is capable of realizing precise compression to the specific part of the penis by setting local protrusions 401 or a thickened structures in specific positions of the inner wall 101, so as to achieve ejaculating control effects.

The ejaculating compression and control area 4 can be implemented by incorporating one or more of the local protrusions 401 on the inner wall 101. The local protrusions 401 can be made from flexible materials and have various shapes such as strips, points, or rings. Height and flexibility of the local protrusions 401 are carefully designed to provide sufficient pressure to achieve the function of ejaculating control without compromising overall wearing comfort.

The local protrusions 401 are usually arranged in an area corresponding to a vas deferens of the penis to ensure that pressure can be applied to key parts during wearing, thereby delaying the ejaculating time and enhancing control over sexual intercourse.

Another way to achieve local compression is to introduce a thickened inner wall inside the ejaculating compression and control area 4, the thickened structure can be implemented by increasing a thickness of the inner wall material or using material with higher hardness, this design is capable of providing uniform compression over a larger area, and is suitable for application scenarios requiring a large area of ejaculating control.

Length and position of the thickened area are also precisely defined to ensure that adequate and stable compression can be provided during use while avoiding discomfort or damage to other parts of the penis.

In another form of local compression, the ejaculating compression and control area 4 becomes prominent only when the thin-walled structure 1 deforms, that is, when the massage device is worn. Specifically, when the massage device is in a natural unworn state, the local protrusions in the ejaculating compression and control area 4 appear as a smooth inner wall without any obvious protrusion structure, this design ensures the flatness and portability of the thin-walled structure 1 when not in use, avoiding inconvenience caused by the protrusion structure to the operation and storage in the unworn state.

When the thin-walled structure 1 is worn on the penis, the ejaculating compression and control area 4 automatically forms protrusions due to external pressure or a responsive mechanism of smart materials. The protrusions can be in close contact with the specific part of the penis, providing locally enhanced compression effects, and this design ensures that compression is generated only during use, thus avoiding unnecessary pressure or stimulation.

It should be noted that the protrusions are not conventional protrusions relative to a flat surface but are protrusions relatives to a curved surface of the inner wall 101. In other words, the protrusions are based on the curved surface of the inner wall 101, such that the protrusions can fit more naturally with contours of the penis. When being worn, the protrusions form a larger contact area with the surface of the penis, thereby providing a uniform and stable sense of compression.

For example, the ejaculating compression and control area 4 on the inner wall 101 can be made from highly elastic materials. In the unworn state of the thin-walled structure 1, this area appears to be flush with other parts. However, when the thin-walled structure 1 is worn, this elastic area deforms and forms the local protrusions 401 due to the pressure and external force from the penis, thereby the sense of compression, this design can automatically adapt to the shape and pressure of the penis during wearing, ensuring that the ejaculating compression and control area 4 is in close contact with the surface of the penis, providing precise ejaculating control effects.

Another implementation mode is to make use of shape memory materials, which can return to a preset shape when exposed to heat or subjected to mechanical stimulation. When being worn, the ejaculating compression and control area 4 deforms and highlights the compression structure due to body heat or friction, thereby providing a local sense of compression.

This design cannot only provide the ejaculating control function but also ensure that the thin-walled structure 1 retains its original shape when not in use, thereby improving the wearing comfort and portability.

Figure 40:
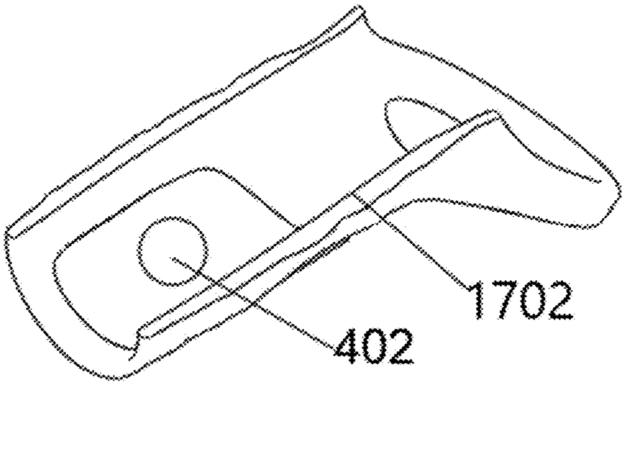
FIG. 40 is a schematic diagram of another structure of an ejaculating compression and control area in a bidirectional stimulation massage device according to the disclosure.

As shown in FIG. 40, in order to meet the needs of different users, the local compression from the ejaculating compression and control area 4 can be designed to be adjustable. For example, an inflatable bag 402 or an adjustable mechanical structure is arranged on the inner wall 101, such that the user can adjust the compression intensity according to the personalized comfort and ejaculating control needs, this design offers greater flexibility and can meet the personalized needs of different users.

Through local compression, the ejaculating compression and control area 4 can apply precise pressure to the specific part of the penis, effectively delaying the ejaculating time, this design is particularly suitable for the users with premature ejaculation problem, helping them gain better control during sexual intercourse.

By applying moderate pressure to a key area of the penis, the local compression design can avoid the discomfort that may be caused by full-range compression. The user can become more comfortable in wearing while enjoying enhanced ejaculating control.

An adjustable local compression function further improves the user experience, enabling the user to flexibly adjust the compression intensity according to their respective individual needs and application scenarios, this personalized design can meet diverse needs of different users, and increase the applicability and satisfaction of the massage device.

The local compression design is not only suitable for daily reproductive health maintenance, but also particularly suitable for treating sexual dysfunction, such as premature ejaculation. The user can gradually improve sexual function and overall sexual health by adjusting compression zone and intensity.

In summary, this embodiment provides more precise and comfortable ejaculating control effects by incorporating the ejaculating compression and control area 4 capable of applying local compression, this design not only effectively prolong a duration of sexual intercourse but also improves the overall user experience of the massage device, making the device become a powerful and user-friendly reproductive health therapy device.

In one specific embodiment, the ejaculating compression and control area 4 is configured as fully-wrapped compression. Specifically, the fully-wrapped compression design is capable of performing wrapped compression to a specific part of the penis (such as a base section or a middle section) from all directions by arranging an annular structure or a thickened area in a specific area of the inner wall 101, thereby producing more uniform and stable ejaculating control effects.

The ejaculating compression and control area 4 can adopt an annular structure, and the penis is completely encircled by the annular structure on the inner wall 101 in a circumferential direction. When being worn, the annular structure applies uniform pressure to the surface of the penis through the thickened inner wall 101 or embedded elastic material, thereby achieving fully-wrapped compression, this design can ensure that each point in the compression zone is subjected to equal pressure, effectively controlling the ejaculating time. Material of the annular compression structure can be selected from silicone or highly elastic polymer to provide excellent flexibility and comfort.

Another fully-wrapped compression design is to arrange a plurality of sections of thickened areas in a specific axial area of the thin-walled structure 1, the thickened areas are capable of applying pressure to various parts of the penis simultaneously, thereby achieving a wider range of ejaculating control effects. Thickness and hardness of each section of the thickened areas can be independently to meet different compression needs, the plurality of sections of thickened areas can provide a larger compression zone without increasing the overall thickness, thereby enhancing the stability and comfort of the ejaculating control effects.

Figure 42:
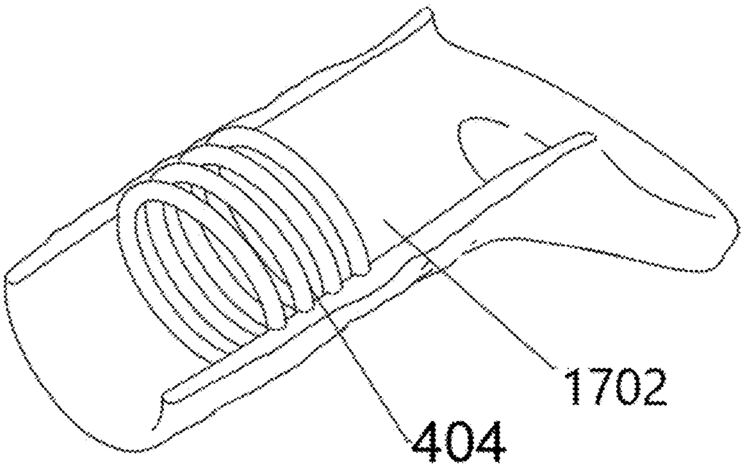
FIG. 42 is a schematic diagram of yet another structure of an ejaculating compression and control area in a bidirectional stimulation massage device according to the disclosure.

As shown in FIG. 42, the fully-wrapped compression can also be implemented via an embedded airbag 404, the embedded airbag 404 is distributed in the circumferential direction of the inner wall 101, and can be inflated or automatically expanded to achieve fully-wrapped compression to the penis when the massage device is worn. The user can adjust the pressure of the embedded airbag 404 to control the compression intensity, this design offers highly adjustable ejaculating control effects, thereby being adapted to different physiological conditions and application scenarios. The embedded airbag 404 is usually made from pressure-resistant and soft material, such as medical-grade silicone to ensure safety and comfort.

Figure 41:
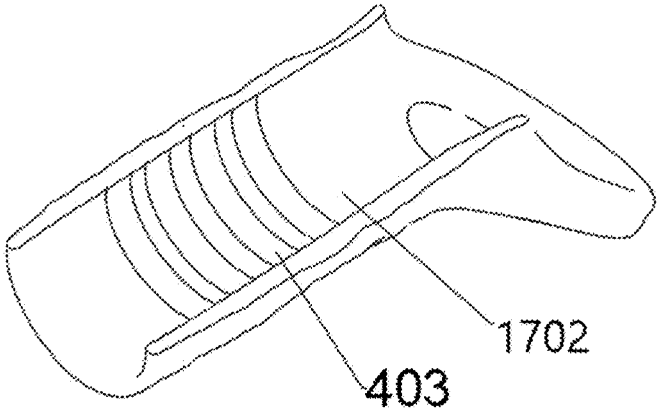
FIG. 41 is a schematic diagram of yet another structure of an ejaculating compression and control area in a bidirectional stimulation massage device according to the disclosure.

As shown in FIG. 41, regarding a more complex design, the fully-wrapped compression zone can adopt a spiral compression structure. The spiral thickened areas are arranged on the inner wall 101 in a spiral pattern, forming a compression zone similar to a spiral band 403. When the massage device is worn, the spiral compression zone can provide a gradually increasing pressure, forming continuous compression effects from a base to a tip of the penis, thereby enhancing ejaculating control effect, this design cannot only control the ejaculating time but also improve erection hardness and duration of the penis during sexual intercourse.

The design of fully-wrapped compression ensures uniform pressure across the entire compression zone, avoiding discomfort or excessive stimulation that may result from local compression. By wrapping the penis in all directions, the design can ensure the stability of ejaculating control effects, and prolong the duration of sexual intercourse.

The massage device can provide the fully-wrapped compression, the user can achieve better ejaculating control effects, and enhance the erection hardness of the penis, thereby improving overall sexual experience. this design is particularly suitable for users who need strong ejaculating control effects, and can also treat sexual dysfunction.

The design of fully-wrapped compression is highly adaptable, allowing for adjustments based on physiological characteristics and needs of different users. For example, the user can customize compression intensity and range to achieve personalized physiotherapy effects by adjusting a pressure of the embedded airbag 404 or selecting different materials.

In summary, the design of fully-wrapped compression in this embodiment provides stronger ejaculating control effects and more comfortable user experience for the bidirectional stimulation massage device. By fully wrapping and applying pressure to the penis evenly, the massage device can significantly improve physiological control and sexual function, making the device become a powerful and widely adaptable reproductive health physiotherapy device.

Of course, the arrangement of the ejaculating compression and control area 4 further overcomes the difficulty in determining a diameter of the thin-walled structure 1.

When the diameter of the thin-walled structure 1 is too small, it is very difficult for the user to wear the massage device, despite that sufficient compression force can be provided to improve the ejaculating control effects. A too small diameter will make the massage device very difficult to be worn, increasing the difficulty for wearing by the user, or even causing discomfort or friction injuries.

On the contrary, when the diameter of the thin-walled structure 1 is too large, the massage device will be easily to be worn and comfortable, but it will not provide the necessary compression, resulting in unsatisfactory ejaculating control effects. A too large diameter could lead to instability of the thin-walled structure 1 during use, affecting overall massage and physiotherapy effects.

By incorporating the ejaculating compression and control area 4, the disclosure skillfully balances the contradiction between a diameter size and compression effects. When the massage device is worn, the ejaculating compression and control area 4 can provide local or fully-wrapped compression, thereby achieving effective compression, regardless of the diameter of the thin-walled structure 1. The ejaculating compression and control area 4 allows for a more comfortable diameter of the thin-walled structure 1, such that the user can wear the massage device easier without significant concerns about difficulty during use. In addition, the ejaculating compression and control area adjusts automatically to form required compression force, thereby producing good ejaculating control effects. Various structural forms of the ejaculating compression and control area 4 (such as the annular structure, the thickened areas, and the airbag structure) make the massage device highly adaptable. Desired compression effects can be achieved in spite of slightly different diameters, this design cannot only improve convenience of use, but also ensure effective ejaculating control function.

The user can choose personalized compression structure according to his personal needs, such as the adjustable embedded airbag or elastic material, to precisely control compression strength, such that the diameter of the thin-walled structure 1 can be flexibly adapted even in different application scenarios, and good compression effects can be produced. The flexibility not only improves user experience but also broadens the practical application range of the massage device.

Through intelligent design of the ejaculating compression and control area 4, the disclosure solves the problems caused by the thin-walled structure 1 being too large or too small in the diameter, achieving an optimal balance between wearing convenience and compression effects. This design ensures that the user can easily wear the massage device, while achieving sufficient ejaculating control effects, such that the functionality and user experience of the massage device are significantly improved.

Figure 43:
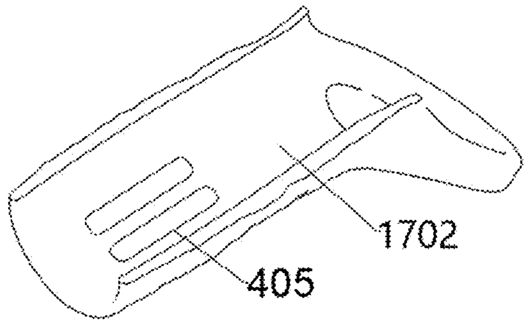
FIG. 43 is a schematic diagram of yet another structure of an ejaculating compression and control area in a bidirectional stimulation massage device according to the disclosure.

As shown in FIG. 43, a fourth embodiment of the disclosure provides a bidirectional stimulation massage device, and on the basis of the previous embodiment, the ejaculating compression and control area 4 on the inner wall 101 is provided with a ridge-like protrusion 405;

- the ridge-like protrusion 405 is configured to provide local compression to an area where the penis being in contact with the ridge-like protrusion 405; and
- where a pressure P1 generated by the local compression is greater than an average pressure P0 applied by the thin-walled structure 1 to the penis that wears the massage device.

In this embodiment, the ejaculating compression and control area 4 of the inner wall 101 is provided with the ridge-like protrusion 405 to produce more precise and effective local compression. The ejaculating compression and control area 4 is provided with one or more of the ridge-like protrusion 405, which extend along the inner wall 101 and are usually designed to match an anatomical structure of the penis, so as to ensure that the ridge-like protrusion can be in precise contact with and apply compression to the key area of the penis, such as the vas deferens or a main nerve area of the penis, when the massage device is worn.

The design of the ridge-like protrusion 405 enables the same to provide significant local compression to the key parts of the penis being in close contact with the ridge-like protrusion. Since the ridge-like protrusion 405 applies the pressure in a concentrated manner, the pressure P1 generated therefrom is obviously higher than the average pressure P0 applied by the thin-walled structure 1 to other parts of the penis, this design effectively controls an ejaculation process, extends the duration of sexual intercourse, and improves physiological experience of the user.

The ridge-like protrusion 405 can be designed in various shapes, such as linear, wavy, or toothed, to provide different forms of compression sensation. The ridge-like protrusion 405 is usually made from silicone or soft plastic with good elasticity to ensure that the massage device can maintain wearing comfort and safety while providing sufficient compression force. Height and hardness of the ridge-like protrusion 405 is carefully designed to adapt to physiological characteristics of different users, thereby providing effective compression while avoiding excessive stimulation or discomfort.

By incorporating the ridge-like protrusion 405, this embodiment can provide more precise local compression, the design of the ridge-like protrusion 405 allows for concentrated force to the key parts of the penis, thereby significantly improving ejaculating control effects and delaying the ejaculating time, which is particularly beneficial for the users with premature ejaculation problem and is capable of helping them better control rhythm of sexual intercourse.

Since the ridge-like protrusion 405 can provide increased compression to the specific area, this embodiment cannot only achieve the ejaculating control function, but also improve the physiological experience of the user by stimulating the specific parts of the penis, and the user can accordingly feel a stronger sense of stimulation, thereby improving the overall sexual pleasure.

Although the ridge-like protrusion 405 strengthens the local compression intensity, but design and material of the ridge-like protrusion ensure comfort of wearing. Elasticity and softness of the ridge-like protrusion 405 prevent discomfort or damage to the penis while providing compression, which not only ensures the ejaculating control effects, but also guarantees the comfort during wearing.

The design of this embodiment is suitable for various scenarios and can play an effective role in both daily use and physiological regulations in special situations. The user can choose different shapes and sizes of the ridge-like protrusion 405 to achieve personalized physiotherapy effects.

In this embodiment, by arranging the ridge-like protrusion 405 in the ejaculating compression and control area 4, this embodiment further improves the ejaculating control effects and user experience of the bidirectional stimulation massage device. The local compression provided by the ridge-like protrusion 405 allows for more precise ejaculating control and improved physiological pleasure, making the massage device have a wide application value in the reproductive health and sexual function improvement.

Figure 4:
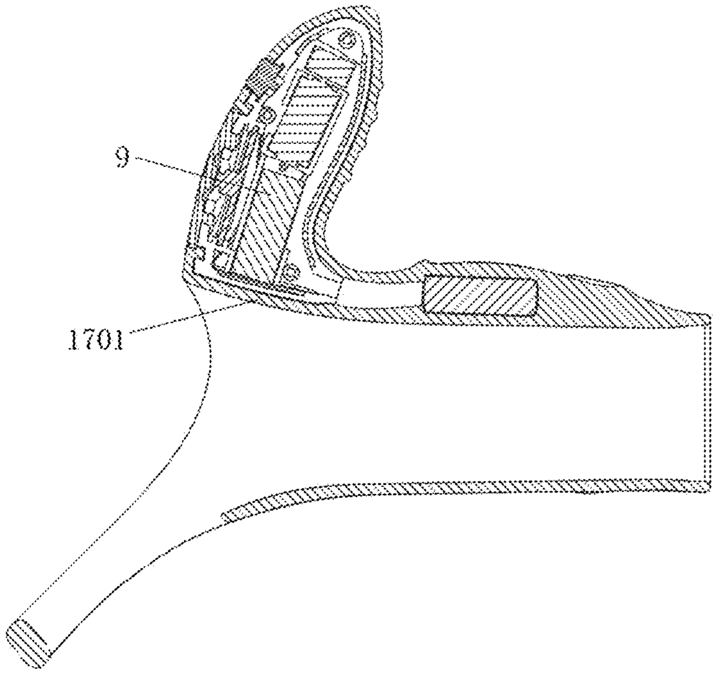
FIG. 4 is a sectional view of the structure shown in FIG. 3.
Figure 5:
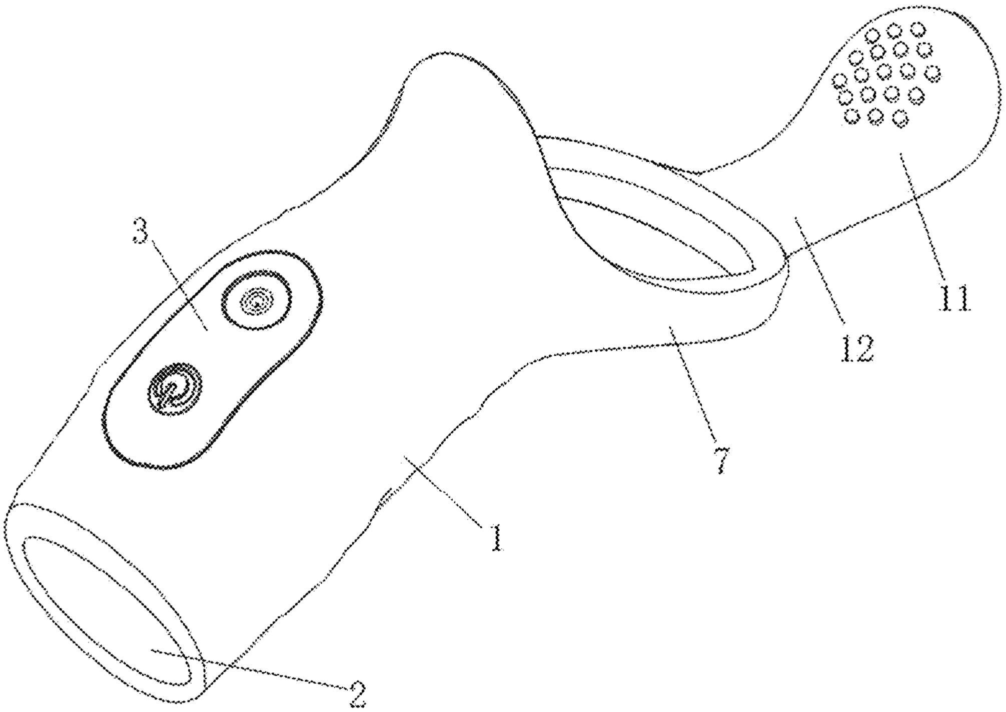
FIG. 5 is a third perspective view of a bidirectional stimulation massage device according to the disclosure.
Figure 6:
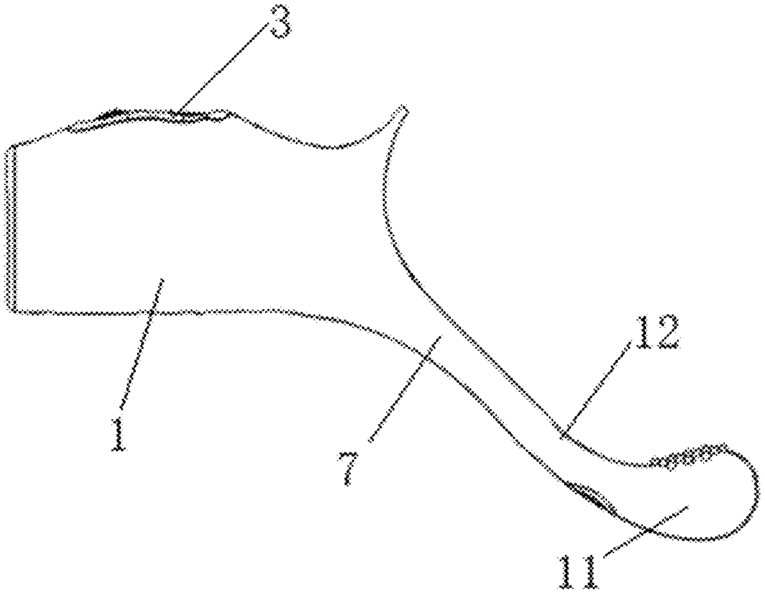
FIG. 6 is a front view of the structure shown in FIG. 5.
Figure 7:
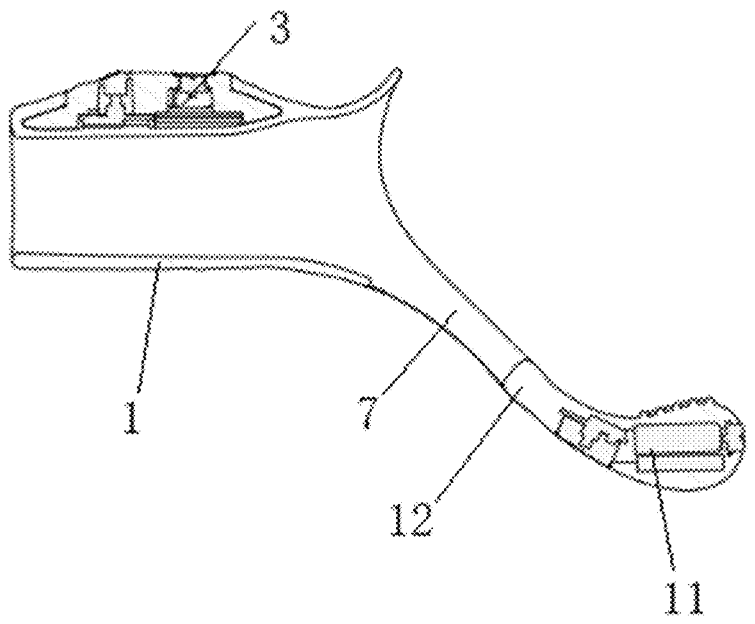
FIG. 7 is a sectional view of the structure shown in FIG. 5.

As shown in FIGS. 1, 4 and 43, a fifth embodiment of the disclosure provides a bidirectional stimulation massage device, and on the basis of the previous embodiment, a position of the first stimulation device 3 on the circumferential wall surface of the thin-walled structure 1 is defined as a first region 1701;

a position of the ridge-like protrusion 405 on the circumferential wall surface of the thin-walled structure 1 are defined as a second region 1702; and the first region 1701 and the second region 1702 are arranged opposite to each other at an interval of 180°.

In this embodiment, the first region 1701 and the second region 1702 are arranged opposite to each other in a circumferential direction, and the layout design ensures that the massage device can provide multiple stimulations from different angles simultaneously during use.

Generally, when the bidirectional stimulation massage device is worn on a male penis, the first region 1701 is specifically a local portion of the circumferential wall of the thin-walled structure 1 facing upward, and the local portion is usually a region located in a middle of the circumferential wall of the thin-walled structure 1. The second region 1702 is specifically another local portion of the circumferential wall of the thin-walled structure 1 facing downward, such that the first region 1701 and the second region 1702 are in a relative positional relationship, and the another local portion is usually also a region located in a middle of the circumferential wall of the thin-walled structure 1.

When the massage device is in a shallow insertion state, the first stimulation device 3 can precisely stimulate a female C point (clitoris) and the surface of the male penis. At the same time, the ridge-like protrusion 405 located in the Second region 7102 on the circumferential wall surface of the thin-walled structure 1 can apply pressure to local vas deferens of the male penis, and this design achieves synchronized stimulation and physiological regulation for both partners by stimulating the C point of the female and the vas deferens of the male simultaneously in the shallow insertion state.

When the massage device is in a deep insertion state, the first stimulation device 3 can be inserted into an area of the inner wall of the vagina, providing deeper vibration or mechanical stimulation, and at the same time, the ridge-like protrusion 405 continues to apply pressure to the vas deferens of the male, such that the first stimulation device 3 can effectively stimulate the inner wall of the vagina of the female, while the ridge-like protrusion 405 can enhance the ejaculating control effects of the male penis.

This embodiment can realize synchronized stimulation of both partners at various points from various angles by arranging the first stimulation device 3 and the ridge-like protrusion 405 opposite to each other at an interval of 180°. The massage device is capable of providing targeted physiological stimulation and improving overall experience of the user both in the shallow insertion state and in the deep insertion state. This design, especially during sexual intercourse, can prolong the duration of sexual intercourse, improve sexual pleasure, and improve the harmony of interactions between partners.

Figure 44:
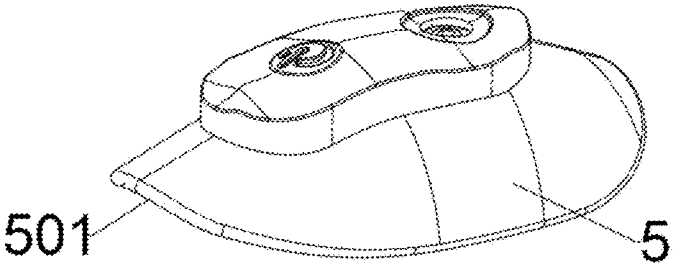
FIG. 44 is a perspective view of a vibration transmission element in a bidirectional stimulation massage device according to the disclosure.
Figure 45:
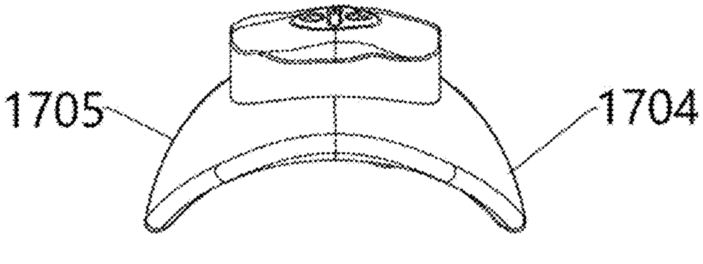
FIG. 45 is a front view of the structure shown in FIG. 44.
Figure 46:
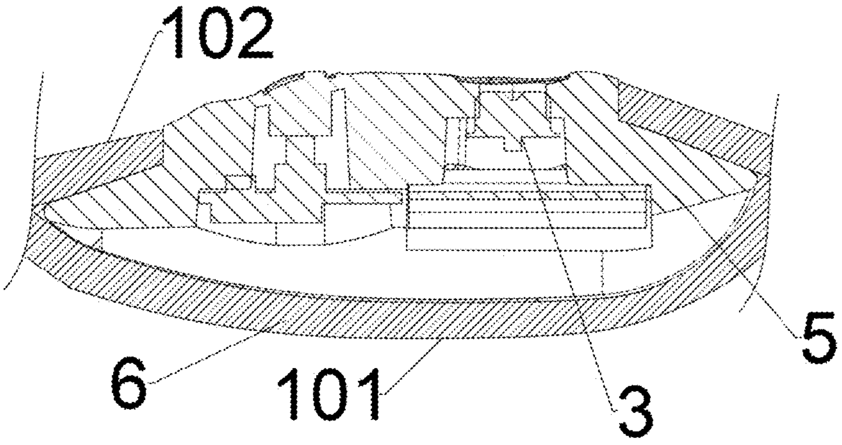
FIG. 46 is a schematic diagram of assembly of a vibration transmission element and a thin-walled structure in a bidirectional stimulation massage device according to the disclosure.

As shown in FIGS. 44-46, a sixth embodiment of the disclosure provides a bidirectional stimulation massage device, and on the basis of the previous embodiment, both the inner wall 101 and the outer wall 102 are provided with a flexible surface layer 6, including:

a vibration transmission element 5;

where the inner wall 101 and the outer wall 102 enclose to form an accommodating cavity;

the vibration transmission element 5 is arranged inside the accommodating cavity;

a hardness D1 of the vibration transmission element 5 is greater than a hardness D2 of the flexible surface layer 6; and the first stimulation device 3 is arranged inside the vibration transmission element 5, which is configured to transmit mechanical vibrations from the first stimulation device 3 to a covered area (referring to the circumferential wall surface of the thin-walled structure 1 being in contact with a human body part).

In this embodiment, a primary function of the vibration transmission element 5 is to efficiently transmit the mechanical vibrations generated by the first stimulation device 3 to the inner wall 101 and the outer wall 102 of the thin-walled structure 1. Since the hardness D1 of the vibration transmission element 5 is greater than the hardness D2 of the flexible surface layer 6, the vibration transmission element can better transmit vibration energy, and reduce energy loss during transmission, that is, although a vibration source may be located only in one local area, the vibrations can be quickly and evenly dispersed to both inner and outer surfaces of the entire thin-walled structure 1 through a medium effect of the vibration transmission element 5.

The arrangement of the vibration transmission element 5 enables the vibration energy to be extended from the local area of the first stimulation device 3 to a larger area, even covering the inner wall 101 and the outer wall 102 of the entire thin-walled structure 1. This extended function makes the user feel vibration stimulation over the larger area when the device is worn, rather than just in the vicinity of the vibration source, the stimulation from all directions can provide more excellent massage experience, contributing to the improvement of overall physiotherapy effects.

The vibration transmission element 5 further plays a role in evenly distributing the vibrations. During the transmission process of vibrations, the vibration transmission element 5 can avoid excessive concentration of vibrations in the local area, and evenly disperse the vibrations to the covered area, the even distribution effects are very important as it can ensure that both the inner wall 101 and the outer wall 102 of the entire thin-walled structure 1 receive synchronized vibration stimulation, thereby avoiding discomfort or suboptimal physiotherapy effects caused by excessive or weak local vibrations.

The vibration transmission element 5, due to high hardness and conductivity of its material, can maintain stability of vibrations, and ensure that the vibration intensity will not be significantly attenuated during the transmission process. that is, the vibration transmission element 5 can stably transmit the vibration energy to a target area, regardless of the power of the vibration source, thereby providing continuous and effective stimulation.

The vibration transmission element 5 further has a structural support function, and can provide necessary support to the flexible surface layer 6, thereby preventing the flexible material from being overly deformed under stress, which could affect the vibration transmission effects. In addition, the vibration transmission element 5 can protect the first stimulation device 3 therein from external pressure or impact, thereby extending the service life of the massage device.

By adjusting shape, thickness, or material of the vibration transmission element 5, various types of vibration effects can be achieved. For example, a thinner transmission element can provide more sensitive high-frequency vibrations, while a thicker or harder transmission element can produce deeper low-frequency vibrations, and diverse vibration effects can meet personalized needs of different users, making the massage device adaptable to various physiotherapy and massage scenarios.

Therefore, the vibration transmission element 5 plays a crucial role in this embodiment, it is not only a core medium for transmitting the mechanical vibrations, but also plays a key role in extending a vibration range, even distribution of vibrations, maintenance of stability of the massage device, and structural support, and the like. Through the optimized design of the vibration transmission element 5, the bidirectional stimulation massage device can provide the user with more comprehensive, comfortable, and effective massage experience.

Moreover, the material selection of the vibration transmission element 5 is essential for efficient transmission of vibrations and stable structural support. In this embodiment, the material of the vibration transmission element 5 can be optimized and selected according to different needs, and some common material suitable for the vibration transmission element 5 are described as follows:

metal alloys such as aluminum alloy, stainless steel, and titanium alloy.

Characteristics: metal alloys have high hardness and excellent performance of vibration transmission, and they can quickly transmit vibration energy while maintaining stability and intensity of the vibrations. Metal alloys also provide good durability and fatigue resistance, making them suitable for suitable for scenarios that require high intensity and long-term use.

Applicable scenarios: the transmission element made from the metal alloys is suitable for applications that require strong vibrations and deep massage effects, especially for physiotherapy devices, and stable and robust vibration transmission can be accordingly provided.

Rigid plastics such as polyamide (nylon), polycarbonate (PC), and polyoxymethylene (POM).

Characteristics: rigid plastic materials are lightweight, with good mechanical strength and wear resistance, therefore, they can effectively transmit vibrations while providing a certain degree of flexibility, making them suitable for being designed into various complex shapes to meet different device requirements. Rigid plastics also feature good processability and low cost, making them ideal for mass production.

Applicable scenarios: the rigid plastics are suitable for vibration devices that require lightweight design, especially for portable massage devices, and efficient vibration transmission and comfortable user experience can be accordingly provided.

Carbon fiber composite material, glass fiber composite material, carbon nanotube reinforced composite material, and the like.

Characteristics: the composite materials have high strength, light weight, and excellent vibration transmission performance, and they can effectively transmit and evenly distribute vibration energy, while having high design flexibility. The composite materials usually have good fatigue resistance, and are suitable for the design of high-performance devices.

Applicable scenarios: composite materials are suitable for high-end massage devices or application scenarios that require superior performance, and they can provide excellent vibration transmission effects while reducing device weight, thereby improving portability and comfort of the devices.

Silicone-reinforced materials such as silicone and metal or fiber composite materials.

Characteristics: silicone is usually soft and elastic, but when being compounded with metal or fiber materials, silicone-reinforced materials can be formed, hardness and vibration transmission performance of the silicone can be significantly enhanced. Silicone-reinforced materials retain the comfort and safety of silicone while improving the vibration transmission capability thereof.

Applicable scenarios: silicone-reinforced materials are suitable for application scenarios that require a balance between comfort and effective vibration transmission, especially for massage devices that need to be worn for a long period of time, and more comfortable user experience can be accordingly provided.

Hardness and density of materials determine the efficiency of vibration transmission. The metal alloys and composite materials usually have higher transmission efficiency, while rigid plastics have relatively lower efficiency, which, however, can be compensated by optimizing the design.

For a portable or long-wearing device, weight of the material is crucial. The composite material and rigid plastics are often selected for the device due to their lightweight advantages. The silicone-reinforced materials balance comfort and effective vibration transmission.

The processing difficulty and cost of different material vary greatly. The rigid plastics have good processability, and are suitable for mass production, while the composite materials and metal alloys require more complex processing technology and are more costly.

Selection of the material for the vibration transmission element 5 largely determines the performance, comfort, and service life of the massage device. In this embodiment, the metal alloys, rigid plastics, composites, or silicone-reinforced materials can be selected according to different application requirements. The materials have their respective unique characteristics, and efficient vibration transmission, stability, and user comfort of the vibration transmission element 5 can be achieved by selecting reasonable material and optimizing the design.

As shown in FIGS. 1, and 44-46, a seventh embodiment of the disclosure provides a bidirectional stimulation massage device, and on the basis of the previous embodiment, the vibration transmission element 5 includes:

a first transmission edge 501;

where the first transmission edge 501 is arranged at a front end 1703 of the thin-walled structure 1 in the axial direction.

In this embodiment, the vibration transmission element 5 is designed to have the first transmission edge 501, which is arranged at the front end 1703 in the axial direction of the thin-walled structure 1, this design allows for the concentration and effective transmission of vibration energy to the front end 1703, providing stronger stimulation to a target part at the front end 1703.

Specifically, the design of the first transmission edge 501 is intended to enhance the vibration effects at the front end 1703 of the thin-walled structure 1. The front end 1703 of the thin-walled structure 1 is usually in contact with sensitive parts (such as the C point or vaginal entrance of the female) during massage. By concentrating the vibration energy on the first transmission edge 501, the massage device can provide more precise and intense stimulation effects in the shallow insertion state, thereby improving the physiological experience of the user.

In the deep insertion state, the first transmission edge 501 can further enhance stimulation of the inner wall of the vagina or the male penis by linkage with other components (such as internal mechanical structures). Through the multi-functional approach, the arrangement of the vibration transmission element 5 allows for balanced and effective physiotherapy effects in the application scenarios at different depths.

By arranging the first transmission edge 501 at the front end 1703, this embodiment realizes concentrated transmission of vibration energy, this design can effectively enhance the vibration intensify at the front end 1703 and provide the user with stronger and more precise stimulation, and is especially suitable for massage of the sensitive parts.

The vibration concentrated at the front end 1703 can directly act on the sensitive parts, such as the C point of the female, in the shallow insertion state, significantly improving the physiological pleasure of the user. In addition, in the deep insertion state, the design of the first conduction edge 501 can further enhance continuous stimulation of the inner wall of the vagina or the male penis, producing deeper massage effects.

Since the first transmission edge 501 can effectively concentrate and transmit the vibration energy, the massage device exhibits excellent performance at various depths and in different application scenarios. The massage device can flexibly adapt to different needs of the user, both for local strong stimulation in the shallow insertion state and for wide massage in the deep insertion state.

The design of the first transmission edge 501 optimizes the energy utilization efficiency of the vibration transmission element 5. By concentrating and transmitting the vibrations to the front end 1703, the energy waste is reduced, such that the massage device can produce stronger stimulation effects at relatively low energy consumption, and the overall efficiency of the massage device is improved.

In this embodiment, by arranging the first transmission edge 501 on the vibration transmission element 5, the bidirectional stimulation massage device can more accurately concentrate the vibration energy on the front end 1703 of the thin-walled structure 1. This design not only significantly enhances the intensity and effects of stimulation at the front end 1703, but also improves the adaptability and user experience of the massage device in various application scenarios.

As shown in FIGS. 44-46, an eighth embodiment of the disclosure provides a bidirectional stimulation massage device, and on the basis of the previous embodiment, the vibration transmission element 5 includes:

- a first transmission area 1704;
- a second transmission area 1705;
- where the first transmission area 1704 and the second transmission area 1705 extend from a center of the first region 1701 respectively along the circumferential wall surface of the thin-walled structure 1 towards the second region 1702; and
- a radian covered by a surface area formed by the extension of the first transmission area 1704 and the second transmission area 1705 on the circumferential wall surface of the thin-walled structure 1 is less than $\pi/2$.

In this embodiment, the vibration transmission element 5 is divided into two main transmission areas, that is, S11 and S12, the first transmission area 1704 and the second transmission area 1705 are centered on the center of the first region 1701 and extend towards the second region 1702 along a circumference of the thin-walled structure 1. This design enables the vibration to extend from a center point of the first region 1701 to both sides, forming a wider vibration coverage.

Specifically, a coverage area formed by the extension of the first transmission area 1704 and the second transmission area 1705 on the circumferential wall surface of the thin-walled structure 1 has a radian not less than $\pi/2$. This wide-angle coverage design ensures that the vibration transmission element 5 can cover a larger area of both the inner wall 101 and the outer wall 102 of the thin-walled structure 1, thereby providing the user with more uniform vibration stimulation from all directions. This design is particularly suitable for massage and physiotherapy scenarios that require extensive vibration effects. Since the first transmission area 1704 and the second transmission area 1705 are respectively located on two sides of the circumference of the thin-walled structure 1 and are symmetrically distributed, they can maintain good balance during the vibration transmission process. The symmetry ensures that the vibration energy can be transmitted evenly in the areas on both sides, and the overall massage effects of the massage device are accordingly improved.

By extending the first transmission area 1704 and the second transmission area 1705, the vibration transmission element 5 is capable of simultaneously producing vibration at a plurality of points on the inner wall 101 and the outer wall 102, The synchronized stimulation at the plurality of points can provide three-dimensional massage experience, and is suitable for reproductive health physiotherapy that requires stimulation of various parts at the same time.

The design of radian coverage of the first transmission area 1704 and the second transmission area 1705 ensures that vibration can spread over a larger area of the thin-walled structure 1, especially when the radian is not less than $\pi/2$, the vibration energy can better act on a larger massage area. The user can feel even stimulation from various directions, both on the inner wall 101 and the outer wall 102 of the thin-walled structure 1.

Through the symmetrical design of the first transmission area 1704 and the second transmission area 1705, this embodiment can ensure the balance of vibration transmission. The synchronized transmission of vibration on both sides keeps the entire thin-walled structure 1 stable during operation, thereby avoiding the problem of reduced comfort or suboptimal massage effects due to uneven vibration.

By virtue of a wider and more uniform vibration coverage area, this embodiment can provide the user with deeper and more comprehensive massage experience, especially for the users who require simultaneous vibration stimulation at different points in various directions, this design can significantly improve the comfort and effects.

In another specific embodiment, the radian covered by the surface area formed by the extension of the first transmission area 1704 and the second transmission area 1705 on the circumferential wall surface of the thin-walled structure ranges from 1.7 to $\pi$, this design further expands the vibration coverage area and enhances the transmission effects, providing the user with deeper and more comprehensive massage experience.

A range of radian covered by the surface area formed by the extension of the first transmission area 1704 and the second transmission area 1705 on the circumferential wall surface of the thin-walled structure is designed to be 1.7 to $\pi$. Compared to the previous design with a range of radian being not less than $\pi/2$, the expanded range of radian can cover a large area of the thin-walled structure 1, such that an effective area for vibration can be increased, and more extensive physiological stimulation can be realized.

When a coverage radian of the first transmission area 1704 and the second transmission 1705 in the circumferential wall direction of the thin-walled structure 1 is expanded to 1.7 to $\pi$, the vibration transmission element 5 can transmit vibration energy across a larger area of the inner wall 101 and the outer wall 102 of the thin-walled structure 1, and more comprehensive stimulation, both for the penis on the inner wall 101 and for the vagina on the outer wall 102, can be realized. This design provides the user with stronger, more uniform, and continuous stimulation when the massage device is used.

A greater radian formed by the extension of the first transmission area 1704 and the second transmission area 1705 ensures that vibration is not just concentrated in a small area, but can form a synergistic effect across multiple areas, the synergistic effect is particularly suitable for reproductive health physiotherapy that requires simultaneous stimulation of multiple areas, which can enhance the massage effects while improving the overall user experience.

The expanded range of radian allows for more precise adjustment to the design of the first transmission area 1704 and the second transmission area 1705. For example, by setting different vibration intensities or frequencies in the first transmission area 1704 and the second transmission area 1705, the user can enjoy personalized massage. This design provides the user with more options, making the massage device adaptable to a wider range of application scenarios and personal needs.

The design of expanded range of radian enables the massage device adaptable to various application scenarios, whether for daily reproductive health physiotherapy or for sexual function regulation in special cases, it can provide physiotherapy effects, The versatility of the massage device makes it have greater market potential and competitiveness.

As shown in FIGS. 1-2, a ninth embodiment of the disclosure provides a bidirectional stimulation massage device, and on the basis of the previous embodiment, the massage device further includes:

a collar 7;

the collar 7 is arranged at a rear end 1706 of the thin-walled structure 1 in the axial direction; and the collar 7 is arranged on a side of the second region 1702 of the thin-walled structure 1 in the circumferential direction, and is suitable for being sleeved over testicles when the thin-walled structure 1 is worn, such that the thin-walled structure 1 can be stabilized.

In this embodiment, the arrangement of the collar 7 can ensure the firmness and comfort of the massage when in use. The introduction of the collar 7 not only provides physical stability but also reduces the shaking or dislocation of the thin-walled structure 1 during use by fixing a position of the testicles, this design further improves the wearing comfort of the massage device, especially during the prolonged period of use, and the user can enjoy better experience. The collar 7 is usually made from soft and flexible materials such as medical-grade silicone or flexible plastic. Selection of the material ensures that the collar 7 can provide the necessary securing force without causing excessive pressure or discomfort to the testicles. Moreover, size and elasticity of collar 7 are carefully designed to accommodate the physiological characteristics of different users, enabling it to be easily worn and maintain proper securing force during use, and avoiding inconvenience caused by being too tight or too loose.

The collar 7 is designed to be easy to wear and adjust, allowing the user to quickly and correctly sleeve it on the testicles, this design takes into account the convenience of use, and reduces the complexity of operation, enabling the massage device to be put into use quickly.

Figure 33:
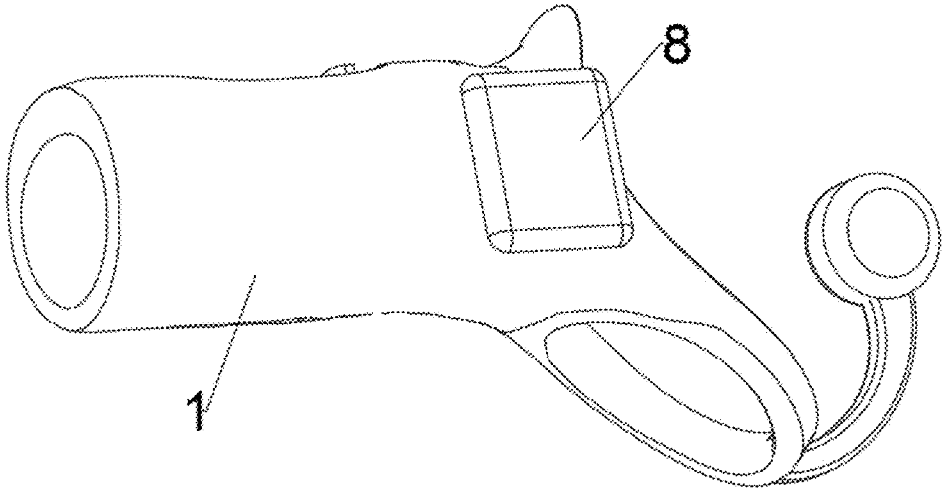
FIG. 33 is a schematic diagram of an installation position of an electric control compartment in a bidirectional stimulation massage device according to the disclosure.

By introducing collar 7 at the rear end 1706 of the thin-walled structure 1, this embodiment significantly enhances the stability of the massage device. The testicle sleeve function of the collar 7 prevents the massage device from slipping or shifting when in use, making the vibration and massage effects more continuous and uniform. As shown in FIG. 33, a tenth embodiment of the disclosure provides a bidirectional stimulation massage device, and on the basis of the previous embodiment, the massage device further includes:

an electric control compartment 8;

the electric control compartment 8 is arranged at the rear end 1706 of the thin-walled structure 1 in the axial direction; and the electric control compartment is located outside a vaginal orifice when the thin-walled structure 1 is inserted into the vagina with the sexual intercourse; and the electric control compartment 8 is configured to accommodate the battery, the drive circuit, and the control circuit.

In this embodiment, the electric control compartment 8 is introduced to improve the structure of the massage device, thereby further enhancing the user experience and functionality of the massage device. The electric control compartment 8 is designed to be arranged in a region at the rear end 1706 of the thin-walled structure 1 in the axial direction, so as to ensure that the electric control compartment 8 is always located outside the vaginal orifice when the thin-walled structure 1 is inserted into the vagina with the sexual intercourse, this design ensures that the electric control compartment 8 does not affect the internal vibration or stimulation function, and the comfort of the user during use is also ensured.

The electric control compartment 8 is mainly used for accommodating the battery, the drive circuit, and the control circuit of the massage device, for example, when the first stimulation device 3 is a vibration motor, the battery provides the massage device with the required electric energy, the drive circuit controls the operation of the vibration motor, and the control circuit is used to adjust vibration mode and intensity of the vibration motor. By integrating the critical components in the electric control compartment 8, this embodiment ensures a compact stricture and functional integration of the massage device.

In this embodiment, electronic components other than the vibration motor are designed to be located outside a human body, this design reduces a number of the electronic components inside the thin-walled structure 1 by placing the electric control compartment 8 and related electronic components outside the human body, thereby reducing the thickness of the thin-walled structure 1. The structural optimization not only makes the thin-walled structure 1 lighter and softer, but also improves the comfort and concealment of wearing.

Further, the electric control compartment 8 transmits the electric energy to the vibration motor and other actuators inside the thin-walled structure 1 through wires, and the introduction of wires can provide stable power supply to the vibration motor inside it despite that the battery, the drive circuit and the control circuit are allowed to be placed outside the human body. The design of wires takes into account a range of motion of the massage device when in use, ensuring that the massage device will not be affected or the comfort will be affected during use.

Figure 3:
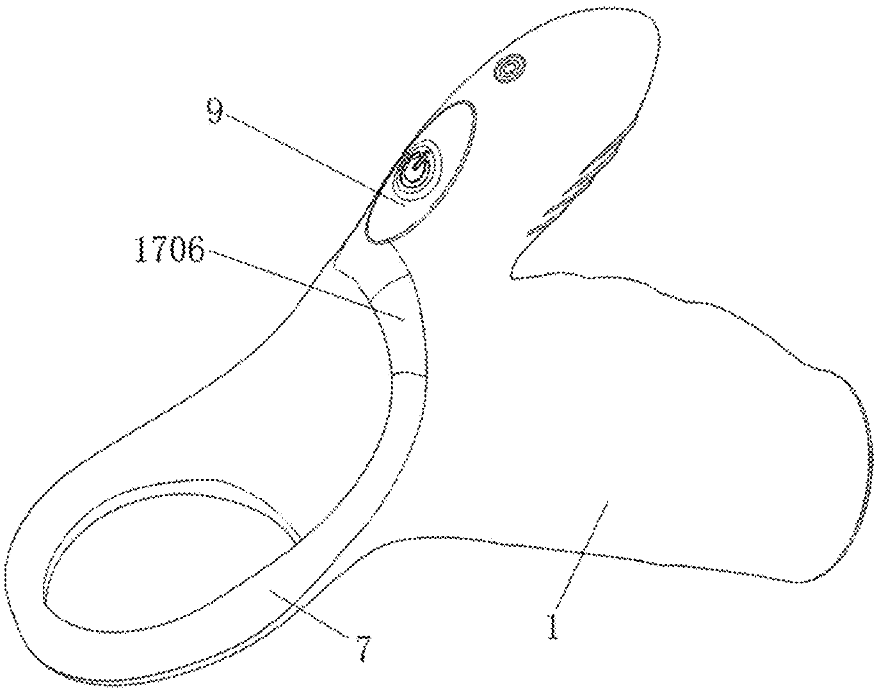
FIG. 3 is a second perspective view of a bidirectional stimulation massage device according to the disclosure.

As shown in FIGS. 3-4, an eleventh embodiment of the disclosure provides a bidirectional stimulation massage device, and on the basis of the previous embodiment, the massage device further includes:

a second stimulation device 9;

the second stimulation device 9 is arranged at the rear end 1706 of the thin-walled structure 1 in the axial direction;

the second stimulation device 9 is arranged on the side of the first region 1701 of the thin-walled structure 1 in the circumferential direction; and the second stimulation device is configured to massage and stimulate the C point.

In this embodiment, the second stimulation device 9 is configured to provide stimulation to the C point of the female when the first stimulation device 3 is inserted or fully inserted into the vagina. It should be noted that the C point in the disclosure refers to a clitoris or labia area of the female, which plays an important role in sensory experience due to its rich nerve direction.

Specifically, when the first stimulation device 3 is inserted or fully inserted into the vagina, the second stimulation device 9 is located outside the vagina, and specifically focuses on massaging the C point. This design enables the massage device to provide bidirectional stimulation at deep layer (internal) and surface layer (external) at the same time when in use, improving the overall massage effects and user experience. When in the deep insertion state, the first stimulation device 3 focuses on massaging and vibrating the inner wall and deep tissues of the vagina, while the second stimulation device 9 focuses on continuous stimulation of the external sensitive areas (C point). This synergistic effect enables the user to enjoy synchronized stimulation both at the deep and surface layers at the same time, further enhancing physiological pleasure.

The second stimulation device 9 can be in various forms, such as a vibrator, a pulse stimulator, or a mini-massage head, that is, and electric stimulation massage device, which can be adjusted according to requirements. The second stimulation device mainly acts on the C point directly through high-frequency vibration or other stimulation means to simulate effects of manual massage.

By arranging the second stimulation device 9 on the side of the first region 1701, this embodiment can keep effective stimulation on the C point even when the first stimulation device 3 is inserted deeply into the vagina. This design significantly enhances the functionality of the massage device, and enables the massage device to provide the user with comprehensive massage experience in various application scenarios.

The second stimulation device can also be a local circumferential wall surface of the thin-walled structure, and the local circumferential wall surface is bent and extended in a direction away from an axis of the thin-walled structure, such that the curved local circumferential wall surface can produce friction with the C point (the clitoris or labia) of the female during sexual intercourse between the male and the female, thereby achieving effective massage and stimulation effects and improving sexual pleasure of the female.

As shown in FIGS. 5-11, a twelfth embodiment of the disclosure provides a bidirectional stimulation massage device, and on the basis of the previous embodiment, the massage device further includes:

a third stimulation device 11;

the third stimulation device 11 is arranged at the rear end 1706 of the thin-walled structure 1 in the axial direction; and the third stimulation device 11 is arranged on the side of the second region 1702 of the thin-walled structure 1 in the circumferential direction.

In this embodiment, the third stimulation device 11 is specifically configured to massage and stimulate the testicles (FIGS. 5, 6, and 7) or an anus (FIGS. 8, 9, 10, and 11) of the male. This design takes into account the physiological characteristics of the male when using the massage device, moderate massage can be provided to promote blood circulation in a testicular area, relieve pressure, and stimulate the anus, and sexual experience and physiological pleasure can be improved. Testicle massage helps improve the sexual function and health of the male, particularly being conducive to delaying the ejaculation time and increasing the sense of sexual pleasure.

The third stimulation device 11 can be in various forms, such as a vibrator, a ball massager, or a flexible tactile device, and the design of the third stimulation device focuses on providing moderate pressure and vibration to gently stimulate the testicles or the anus without causing discomfort or pain.

The third stimulation device 11 is usually made from soft and elastic silicone or medical-grade flexible material to ensure that the pressure to the testicles or the anus during massage is comfortable and effective.

The introduction of the third stimulation device 11 not only provides direct massage to the testicles or the anus, but also works in conjunction with the first stimulation device 3 and the second stimulation device 9 to produce multidimensional stimulation experience. When in use, the user can enjoy massage from a plurality of points, such as the penis, the C point, and the testicles at the same time, which greatly enhances the overall physiological experience and sexual pleasure.

In this embodiment, by introducing the third stimulation device 11, the bidirectional stimulation device further enhances the massage to the testicles or the anus of the male. The third stimulation device 11 is specially designed to provide gentle and effective massage to the testicle or the anus, and cooperates with the first stimulation device 3 and the second stimulation device 9 to provide the user with a full range of physiological stimulation and pleasant experience.

A thirteenth embodiment of the disclosure provides a bidirectional stimulation massage device, and on the basis of the previous embodiment, the massage device further includes:

a second elastic support portion 12;

a first side of the second elastic support portion 12 is connected to the third stimulation device 11; and a second side of the second elastic support portion 12 arranged opposite to the first side is connected to the collar 7.

In this embodiment, the second elastic support portion 12 provides an elastic support mechanism, such that the third stimulation device 11 can move flexibly within a certain range while maintaining stable massage effects on the testicles. Through the elastic connection, the third stimulation device 11 can be fine-tuned when the motion or position of the user changes to ensure the continuity and uniformity of the massage effects. The elastic support structure cannot only adapt to different application scenarios, but also reduce direct impact of external force on the third stimulation device 11, thereby avoiding displacement or weakening of the massage effects of the massage device due to excessive external motion.

The second side of the second elastic support portion 12 is connected to the collar 7, this design makes use of the stability of the collar 7, making the entire massage device more stable during use. The collar 7 not only serves as a fixation point but also provides a robust support point by connecting to the second elastic support portion 12, making the massage effects of the third stimulation device 11 more stable and precise.

By arranging the second elastic support portion 12, the third stimulation device 11 can maintain an appropriate elastic displacement range (2-5 cm) during use, which not only enhances the testicular massage effects, but also improves the overall functionality of the massage device. The third stimulation device 11 can be fine-tuned according to the motion and needs of the user, thereby providing more personalized and customized massage experience.

In this embodiment, by introducing the second elastic support portion 12, stability and flexibility of the bidirectional stimulation massage device are further improved. The design of connection among the second elastic support portion 12, the third stimulation device 11, and the collar 7 ensures effective testicle massage effects and overall functionality of the massage device.

Figure 8:
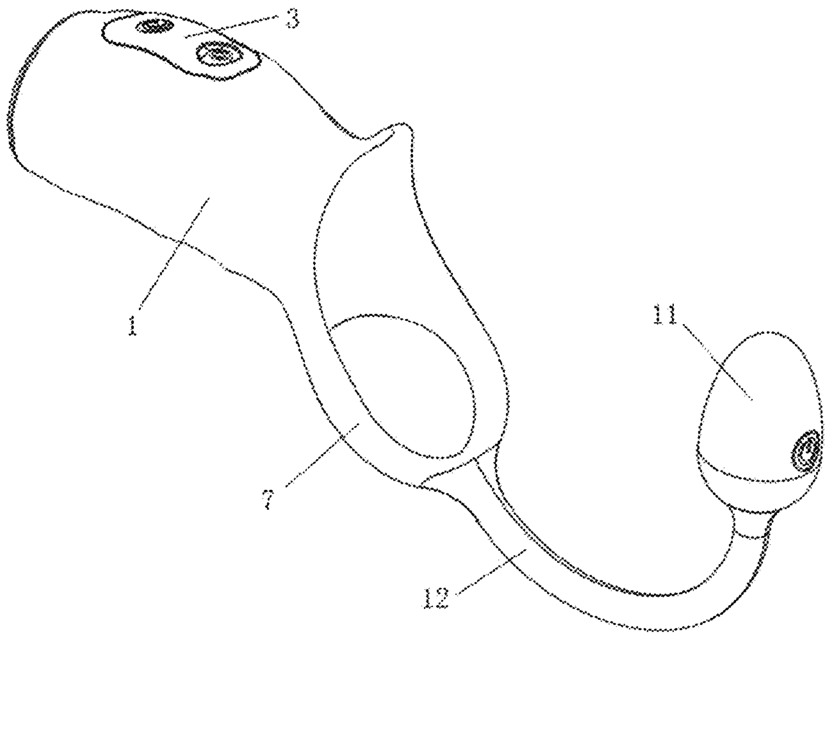
FIG. 8 is a fourth perspective view of a bidirectional stimulation massage device according to the disclosure.
Figure 9:
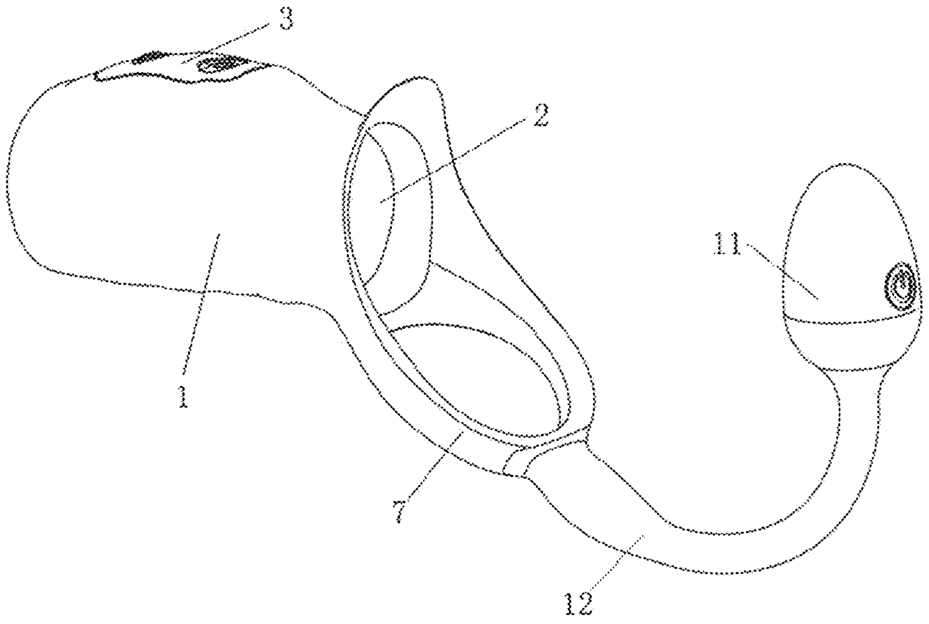
FIG. 9 is a fifth perspective view of a bidirectional stimulation massage device according to the disclosure.
Figure 10:
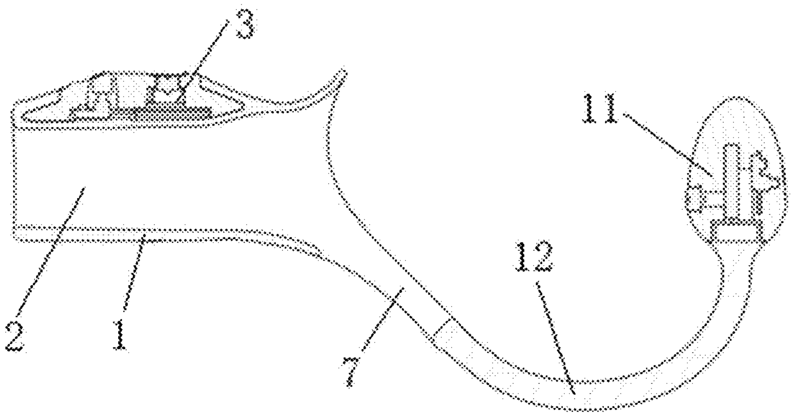
FIG. 10 is a sectional view of the structure shown in FIG. 9.
Figure 11:
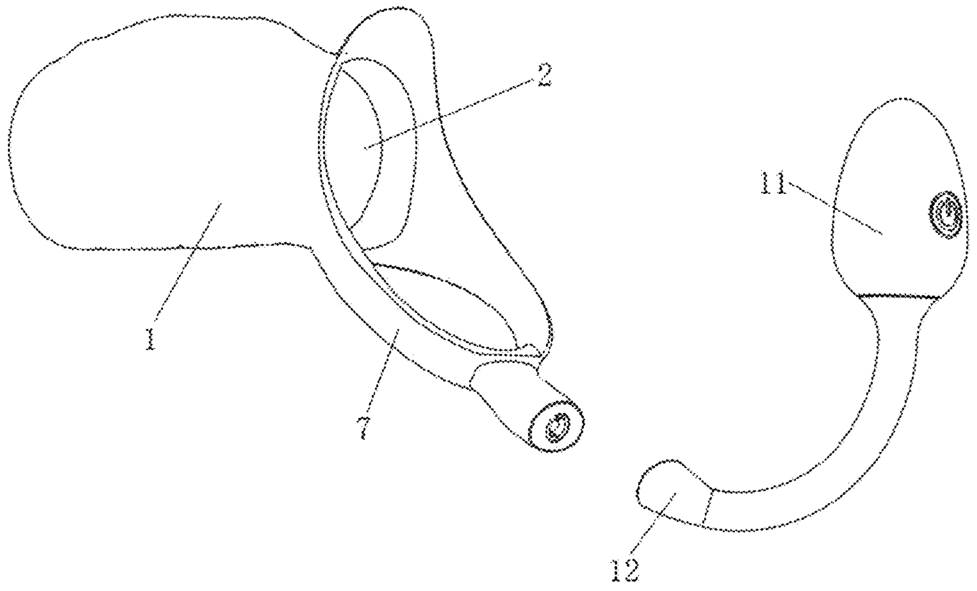
FIG. 11 is a sixth perspective view of a bidirectional stimulation massage device according to the disclosure.

In a specific embodiment, the second elastic support portion 12 is designed as a flexible arm, which can be integrally connected with the collar 7 (as shown in FIGS. 8 and 9) or be detachably connected (as shown in FIGS. 10 and 11). The flexible arm is usually made from flexible materials, such as silicone, polyurethane, or other high-elasticity polymers. The flexible arm can bend and recover in a plurality of directions, providing multidimensional elastic support for the third stimulation device 11, and the flexible arm can adapt to different usage postures and motions, and ensuring that the third stimulation device 11 is always in an optimal massage position. The flexible arm allows for motions in various directions within a certain range, improving the adaptability of the massage device and comfort of the user.

Figure 22:
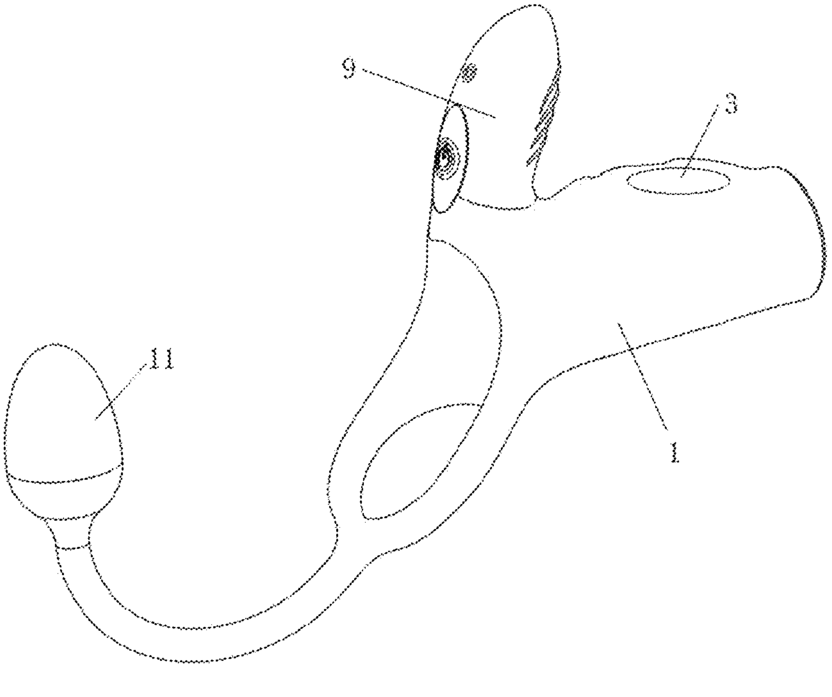
FIG. 22 is an eleventh perspective view of a bidirectional stimulation massage device according to the disclosure.
Figure 23:
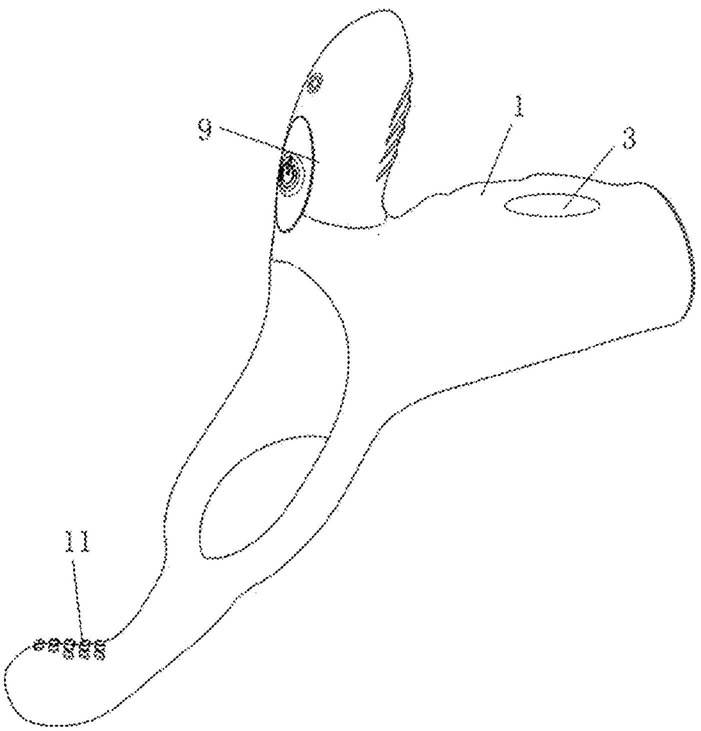
FIG. 23 is a twelfth perspective view of a bidirectional stimulation massage device according to the disclosure.

Further, the second stimulation device 9 and the third stimulation device 11 can be used simultaneously, as shown in FIGS. 22-23.

Figure 12:
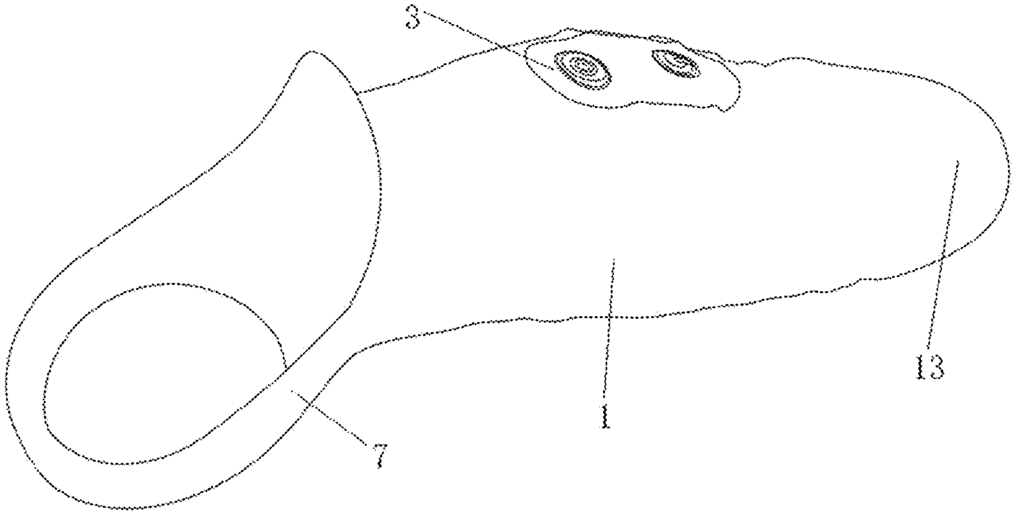
FIG. 12 is a seventh perspective view of a bidirectional stimulation massage device according to the disclosure.
Figure 13:
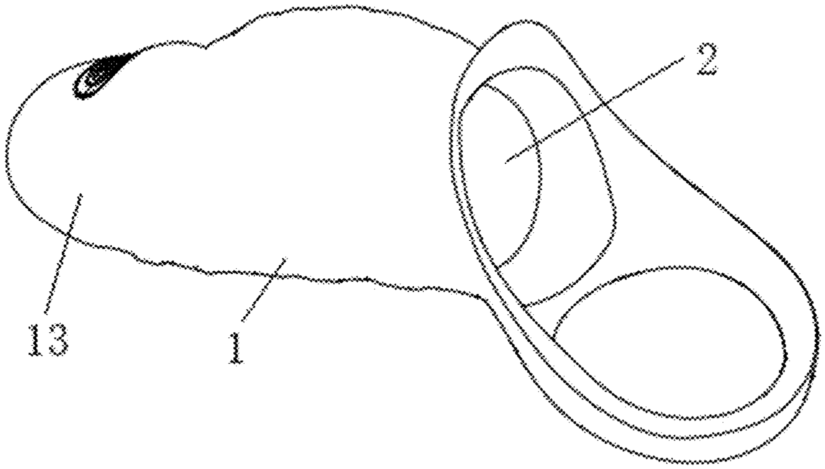
FIG. 13 is an eighth perspective view of a bidirectional stimulation massage device according to the disclosure.
Figure 14:
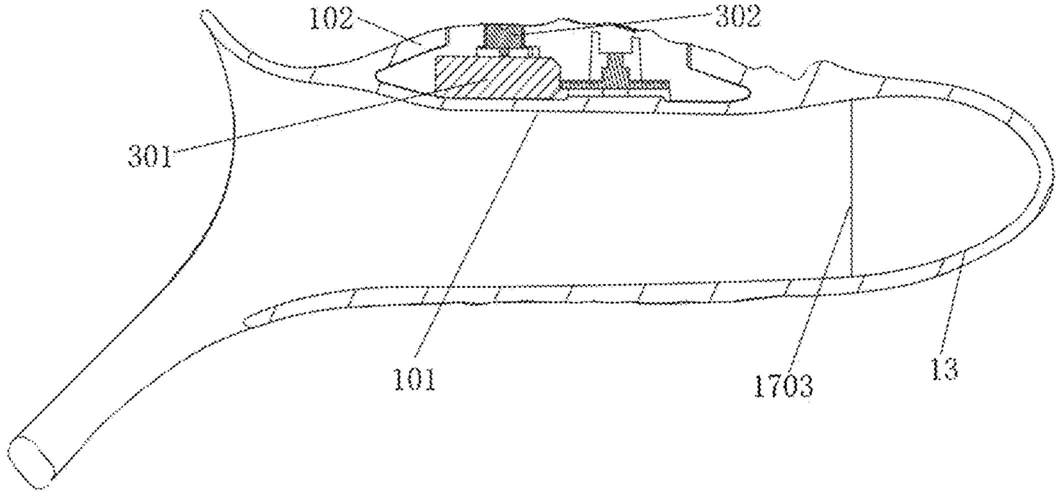
FIG. 14 is a first sectional view of the structure shown in FIG. 13 (excluding a vibration isolation portion).

As shown in FIGS. 12-14, a fourteenth embodiment of the disclosure provides a bidirectional stimulation massage device, and on the basis of the previous embodiment, the massage device further includes:

a coverage portion 13; and the coverage portion 13 is arranged at the front end 1703 of the thin-walled structure 1 in the axial direction.

In this embodiment, the coverage portion 13 is configured to fully cover a glans, such that additional protection can be provided for the glans during use, and discomfort or pain caused by friction or external pressure can be reduced. Moreover, the coverage portion 13 is made from flexible material, making it adaptable to a shape of the glans, and providing gentle massage effects during use.

As described above, in this embodiment, the coverage portion 13 is designed to be located at the second opening 204 of the channel 2, such that the end of the channel 2 closed is closed due to the presence of the coverage portion 13.

The design of the coverage portion 13 can ensure the protection and comfort of the glans while stimulating other parts of the penis. The coverage portion 13 can enhance pleasure of the glans through vibration or other stimulation methods, thereby improving the overall sexual experience.

The coverage portion 13 is made from soft and elastic material such as medical-grade silicone or thermoplastic elastomer (TPE) to conform to the shape of the glans and provide comfortable coverage and moderate pressure. In addition, a surface of the coverage portion 13 can be designed with fine textures or protrusions to enhance the massage effects and increase the intensity of stimulation.

The coverage portion 13 can be integrally formed, or be connected to other part of the thin-walled structure 1 via flexible connectors. This design ensures that the coverage portion 13 can maintain a stable position and shape during use, without shifting or falling off due to external force.

More specifically, the coverage portion 13 can be molded integrally with the channel 2, such that the thin-walled structure 1 and the coverage portion 13 can form an entirety.

More specifically, the coverage portion 13 and channel 2 can be further two separate components connected by the flexible connectors. When in use, the user can choose to assemble the coverage portion 13, such that the coverage portion 13 and the thin-walled structure 1 form an entirety. Alternatively, the user can choose not to assemble the coverage portion 13, but choose to use the thin-walled structure 1 with the first opening 203 and second opening 204 alone.

The coverage portion 13 not only plays a protective role, but also provides gentle massage and stimulation to the glans through material and structural design thereof. When in use, the user can feel continuous sense of pleasure from the glans, significantly enhancing the overall sexual experience.

Since the coverage portion 13 is made from soft and elastic material, comfortable tactile feel and moderate sense of wrapping can be provided during use, such that the user can enjoy a high level of comfort, even with the prolonged period of use, and discomfort caused by excessive pressure can be mitigated.

The synergistic effect between the coverage portion 13 and other stimulation devices can ensure comprehensive physiological stimulation experience, the massage device can provide the user with pleasant high-quality sexual experience and physiotherapy effects, both for the wrapping massage to the glans or stimulation to the penis and testicles from the plurality of points.

Figure 15:
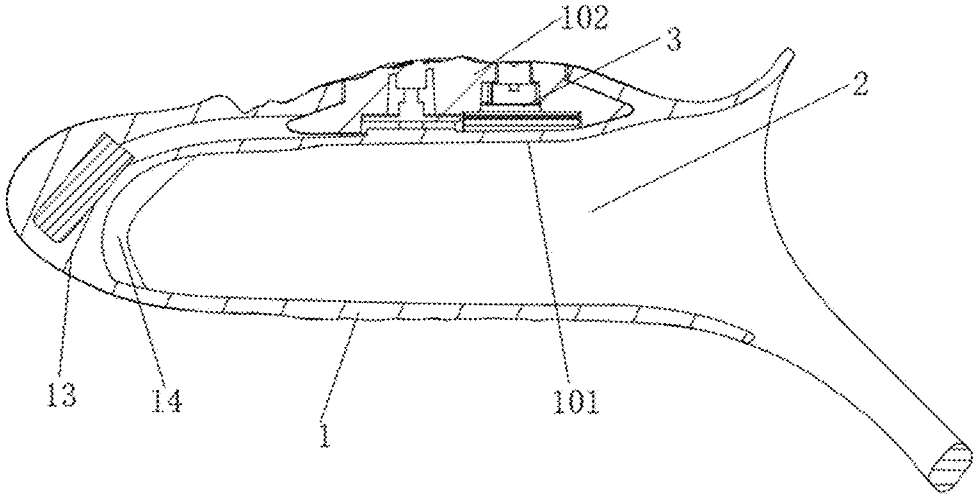
FIG. 15 is a first sectional view of the structure shown in FIG. 13 (excluding a vibration isolation portion).

As shown in FIGS. 15, a fifteenth embodiment of the disclosure provides a bidirectional stimulation massage device, and on the basis of the previous embodiment, the massage device further includes:

a vibration isolation portion 14;

the vibration isolation portion 14 is arranged between the coverage portion 13 and the thin-walled structure 1; and the vibration isolation portion 14 is configured to absorb the vibration energy generated by the first stimulation device 3.

In this embodiment, the vibration isolation portion 14 is arranged between the coverage portion 13 and the thin-walled structure 1, main function of the vibration isolation portion is to absorb and isolate the vibration energy generated by the first stimulation device 3, preventing the vibration energy from being directly transmitted to the coverage portion 13, reducing unnecessary vibration impact and improving comfort of the massage device.

The vibration isolation portion 14 is designed to absorb part of the vibration energy generated by the first stimulation device 3, such that the vibration isolation portion 14 can effectively reduce the direct transmission of vibration to the coverage portion 13, thereby minimizing excessive stimulation to the glans by the coverage portion 13. Therefore, the user can avoid discomfort or decreased sensitivity of the glans due to excessive vibration when in use.

The vibration isolation portion 14 is usually made from materials with excellent shock absorption properties, such as silicone, polyurethane foam, or other high-elasticity shock absorption material. The materials can effective absorb and attenuate vibration energy, ensuring excellent shock absorption effects of the vibration isolation portion 14. In addition, the structural design of the vibration isolation portion 14 is usually multi-layered or porous to further enhance its vibration isolation capability.

By introducing the vibration isolation portion 14, the coverage portion 13 can be more stably fixed on the glans, thereby avoiding discomfort of the glans caused by excessive vibration while providing moderate massage. The vibration isolation design ensures that the coverage portion 13 can provide continuous gentle protection and massage effects on the glans while absorbing external vibration. The introduction of the vibration isolation portion 14 further allows for more uniform and controllable vibrations in the coverage portion 13, enhancing the overall experience of the user.

By isolating part of the vibration energy, this embodiment effectively reduces the transmission of vibration to unnecessary areas, ensuring that the vibration energy is concentrated on desired parts. This design not only improves the vibration efficiency, but also reduces interference of excessive vibration on other parts, thereby improve the overall effects of the massage device.

In a specific embodiment, the vibration isolation portion 14 is designed as a thickened cap-like structure. The vibration isolation portion covers the glans to isolate part of the vibration energy, to weaken stimulation to the glans.

The vibration isolation portion 14, the coverage portion 13, and the thin-walled structure 1 can be processed by an integrated molding process to form an entirety. Alternatively, any two of the components (such as, the vibration isolation portion 14 and the coverage portion 13 form an entirety, or the vibration isolation portion 14 and the thin-walled structure 1 form an entirety, or the coverage portion 13 and the thin-walled structure 1 form an entirety) can be processed by an integrated molding process, with the remaining component being separate, to provide the user with flexible options based on his personal needs. Alternatively, all of the three components can be separate, providing the user with diverse options for combined use.

In this embodiment, by introducing the vibration isolation portion 14, the bidirectional stimulation massage device can provide more precise vibration control and higher comfort in use. The design of the vibration isolation portion 14 not only effectively absorbs and attenuates unnecessary vibration energy, but also ensures gentle protection and massage effects of the coverage portion 13 on the glans.

In the description of embodiments the disclosure, the terms "first", "second", "third" and "fourth" are used for descriptive purposes only, and cannot be construed as indicating or implying relative importance or implicitly indicating the number of technical features indicated. Thus, features defined by "first", "second", "third" and "fourth" may explicitly or implicitly include one or more of the features. In the description of the present invention, "plurality of" means two or more, unless otherwise specified.

In the description of the embodiments of the disclosure, it should be understood that that "-" and "~" represent the same range of two numerical values, and the range includes end values thereof, for example, "A-B" means a range greater than or equaling to A and less than or equaling to B. "A~B" means a range greater than or equaling to A and less than or equaling to B.

In the description of the embodiments of the disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the disclosure have been illustrated and described, it should be understood that those of ordinary skill in the art may make various changes, modifications, replacements and variations to the above embodiments without departing from the principle and spirit of the disclosure, and the scope of the disclosure is limited by the appended claims and their legal equivalents.

What is claimed is:

1. A bidirectional stimulation massage device suitable for being sleeved over a penis, comprising:

a walled structure having a channel and a first stimulation device, wherein the walled structure has an inner wall and an outer wall, the first stimulation device is arranged in a position at a non-end portion of the walled structure; and the first stimulation device is configured to be located between the inner wall and the outer wall, and is capable of providing massage stimulation to both the inner wall and the outer wall at the same time;

the inner wall and the outer wall enclosing to form an accommodating cavity;

a vibration transmission medium being arranged inside the accommodating cavity;

a flexible surface layer being provided on the inner wall;

a hardness (D1) of the vibration transmission medium being greater than a hardness (D2) of the flexible surface layer; and the first stimulation device being arranged inside the vibration transmission medium, which is configured to transmit mechanical vibrations from the first stimulation device to a covered area; and the covered area is an circumferential wall surface of the walled structure for contacting with a human body part.

2. The bidirectional stimulation massage device according to claim 1, wherein the channel is a continuous channel structure formed by a circumferential wall surface of the walled structure and the continuous channel structure is a complete continuous annular wall structure of the channel without any gaps in the circumferential wall surface of the walled structure; or the channel is a non-continuous channel structure formed by the circumferential wall surface of the walled structure and the non-continuous channel structure has a gap or notch in a specific position on a circumferential wall surface of the channel.

3. The bidirectional stimulation massage device according to claim 2, further comprising an electric control compartment, wherein the electric control compartment is arranged at a rear end of the walled structure in an axial direction; and the electric control compartment is located outside a vaginal orifice when the walled structure is inserted into a vagina; and the electric control compartment is configured to accommodate a battery, a drive circuit, and a control circuit.

4. The bidirectional stimulation massage device according to claim 1, wherein the inner wall of the walled structure is provided with an ejaculating compression and control area;

a length (L2) of the ejaculating compression and control area in an axial direction of the walled structure is not less than 2 cm; and the ejaculating compression and control area is configured to provide an ejaculating compression and control function for a user.

5. The bidirectional stimulation massage device according to claim 4, wherein the ejaculating compression and control area on the inner wall is provided with a ridge-like protrusion;

the ridge-like protrusion is configured to provide local compression to an area of the penis;

a pressure (P1) generated by the local compression is greater than an average pressure (P0) applied by the walled structure to the penis that wears the massage device.

6. The bidirectional stimulation massage device according to claim 5, wherein a position of the first stimulation device on a circumferential wall surface of the walled structure is defined as a first region;

a position of the ridge-like protrusion on the circumferential wall surface of the walled structure is defined as a second region; and the first region and the second region are arranged opposite to each other at an interval of 180°.

7. The bidirectional stimulation massage device according to claim 6, wherein the vibration transmission medium is provided with:

a first transmission area and a second transmission area, wherein the first transmission area and the second transmission area extend from a center of the first region respectively along the circumferential wall surface of the walled structure towards the second region; and a radian covered by a surface area formed by the extension of the first transmission area and the second transmission area on the circumferential wall surface of the walled structure is not less than $\pi/2$.

8. The bidirectional stimulation massage device according to claim 7, wherein a radian covered by a surface area formed by an extension of the first transmission area and the second transmission area on the circumferential wall surface of the walled structure ranges from 1.7 to 1.

9. The bidirectional stimulation massage device according to claim 1, wherein the vibration transmission medium is provided with:

a first transmission edge; and the first transmission edge is arranged at a front end of the walled structure in an axial direction.

10. The bidirectional stimulation massage device according to claim 1, further comprising a collar, wherein the collar is arranged at a rear end of the walled structure in an axial direction; and the collar is arranged on a side of a second region of the walled structure in a circumferential direction; and the collar is suitable for being sleeved over testicles when the walled structure is worn, such that the walled structure can be stabilized.

11. The bidirectional stimulation massage device according to claim 1, further comprising a second stimulation device, wherein the second stimulation device is arranged at a rear end of the walled structure in an axial direction; and the second stimulation device is arranged on a side of a first region of the walled structure in a circumferential direction; and the second stimulation device is configured to massage and stimulate a C point.

12. The bidirectional stimulation massage device according to claim 11, wherein the second stimulation device is an electric stimulation massage device; or the second stimulation device is a local circumferential wall surface of the walled structure, and the local circumferential wall surface is bent and extended in a direction away from an axis of the walled structure.

13. The bidirectional stimulation massage device according to claim 11, further comprising a third stimulation device, wherein the third stimulation device is arranged at a rear end of the walled structure in an axial direction; and the third stimulation device is arranged on a side of a second region of the walled structure in a circumferential direction.

14. The bidirectional stimulation massage device according to claim 13, further comprising an elastic support portion and a collar, wherein a first side of the elastic support portion is connected to the third stimulation device; and a second side of the elastic support portion arranged opposite to the first side is connected to the collar.

15. The bidirectional stimulation massage device according to claim 1, further comprising a coverage portion, wherein the coverage portion is arranged at a front end of the walled structure in an axial direction.

16. The bidirectional stimulation massage device according to claim 15, further comprising a vibration isolation portion, wherein the vibration isolation portion is arranged between the coverage portion and the walled structure; and the vibration isolation portion is configured to absorb vibration energy generated by the first stimulation device.

17. The bidirectional stimulation massage device according to claim 1, wherein the walled structure has a set length (L) in an axial direction; and the set length (L) is not less than 4 cm.

18. The bidirectional stimulation massage device according to claim 1, wherein the outer wall of the walled structure is provided with a stimulation structure; and the stimulation structure is spherical protrusions, annular protrusions, or semi-annular protrusions.

* * * * *